(12) United States Patent
Lee et al.

(10) Patent No.: US 9,925,559 B2
(45) Date of Patent: Mar. 27, 2018

(54) GRAPHENE-CONTAINING COATING FILM, AND METHOD FOR PREPARING THE SAME

(71) Applicants: Hyundai Motor Company, Seoul (KR); Korea Institute of Ceramic Engineering and Technology

(72) Inventors: Kyu Geol Lee, Gyeonggi-do (KR); Kwang Il Chang, Gyeonggi-do (KR); Seung Hun Hur, Seoul (KR)

(73) Assignees: Hyundai Motor Company, Seoul (KR); Korea Institute of Ceramic Engineering and Technology, Jinju, Gyeongsangnam-do (KR)

( * ) Notice: Subject to any disclaimer, the term of this patent is extended or adjusted under 35 U.S.C. 154(b) by 191 days.

(21) Appl. No.: 14/945,081

(22) Filed: Nov. 18, 2015

(65) Prior Publication Data

US 2017/0059117 A1   Mar. 2, 2017

(30) Foreign Application Priority Data

Aug. 25, 2015   (KR) .................. 10-2015-0119555

(51) Int. Cl.
*B32B 3/10* (2006.01)
*B05D 3/00* (2006.01)
(Continued)

(52) U.S. Cl.
CPC ............. *B05D 3/007* (2013.01); *C08K 3/00* (2013.01); *C09C 1/00* (2013.01); *C09D 7/1266* (2013.01); *C01B 32/194* (2017.08); *C01B 2204/04* (2013.01); *C01B 2204/22* (2013.01); *C01B 2204/32* (2013.01); *C08K 3/04* (2013.01); *C08K 2201/003* (2013.01); *C08K 2201/011* (2013.01); *F21S 48/1233* (2013.01); *F21S 48/30* (2013.01)

(58) Field of Classification Search
None
See application file for complete search history.

(56) References Cited

U.S. PATENT DOCUMENTS

| 8,257,867 B2 | 9/2012 | Liu et al. | |
| 2010/0009094 A1* | 1/2010 | Lochtman | H05K 3/027 427/555 |

(Continued)

FOREIGN PATENT DOCUMENTS

| KR | 2012-0035659 A | 4/2012 |
| KR | 2012-0039799 A | 4/2012 |

(Continued)

*Primary Examiner* — Christopher Polley
(74) *Attorney, Agent, or Firm* — Mintz Levin Cohn Ferris Glovsky and Popeo, P.C.; Peter F. Corless

(57) ABSTRACT

A graphene-containing coating film includes at least one hydrate represented by Chemical Formula 1 as described herein, a graphene positioned in a shape on the surface of the hydrate represented by Chemical Formula 1, and a silica particle positioned on the surface of the hydrate of Chemical Formula 1 and positioned on the surface of the graphene in a shape of discontinuous island. Particularly, the silica particle includes agglomeration of a plurality of silica nanoparticles. A method of preparing the graphene-containing coating film and a vehicle part such as a head lamp including the same are also provided.

25 Claims, 12 Drawing Sheets

(51) Int. Cl.
  *C08K 3/00*    (2018.01)
  *C09C 1/00*    (2006.01)
  *C09D 7/12*    (2006.01)
  *F21S 8/10*    (2006.01)
  *C08K 3/04*    (2006.01)
  *C01B 32/194*  (2017.01)

(56)          References Cited

U.S. PATENT DOCUMENTS

2010/0021657 A1*  1/2010  Lochtman .............. H05K 3/046
                                                        427/597
2012/0149554 A1   6/2012  Lin et al.
2015/0099214 A1*  4/2015  Khe ..................... H01B 1/24
                                                        429/523
2015/0159039 A1   6/2015  Croutxe-Barghorn et al.

FOREIGN PATENT DOCUMENTS

KR      2012-0053399 A      5/2012
KR      2012-0092431 A      8/2012
KR      2013-0014327 A      2/2013
KR      2013-0067337 A      6/2013
KR         10-1317756 B1   10/2013
KR      2014-0076650 A      6/2014
KR      2014-0120450 A     10/2014
KR         10-1510805 B1    4/2015
KR         10-1510806 B1    4/2015
KR      10-2015-0075503 A   7/2015

* cited by examiner

GRAPHENE-CONTAINING COATING FILM, AND METHOD FOR PREPARING THE SAME

CROSS-REFERENCE TO RELATED APPLICATION

This application claims priority to and the benefit of Korean Patent Application No. 10-2015-0119555 filed in the Korean Intellectual Property Office on Aug. 25, 2015, the entire contents of which are incorporated herein by reference.

TECHNICAL FIELD

The present invention relates to a graphene-containing coating film and a method of preparing the same.

BACKGROUND OF THE INVENTION

Graphene oxide (or graphite oxide, hereinafter GO) is a sheet-shaped carbon material prepared by acid treating graphite, and has a large amount of a hydrophilic functional group such as a carboxyl group (—COOH), a hydroxyl group (—OH), and the like on the surface. The surface oxidizing groups produced through an acid treatment process spontanesouly produce hydrogen-bonds with $H_2O$ molecules, and thus the GO can be prepared in a form of a hydration or in a water-containing slurry state. In general, a solid concentration of the slurry is of about 2 to 8 wt % unless otherwise specifically treated.

When the GO is appropriately included in a film or a structure, strength thereof may be improved and suitable thermal conductivity may be provided, but treatment of the contained moisture may hinder properties.

In general, GO may be prepared in a form of graphene through a chemical reduction method (a hydrazine treatment and the like) and a thermal reduction method. Herein, reduced graphene is particularly referred to as reduced graphene oxide (RGO).

It is evidenced that a part of the oxidizing groups on the RGO surface is not sufficiently removed. Generally, oxygen content of the surface oxidizing groups is less than or equal to about 5 wt % relative to a carbon backbone, and thus graphene (RGO) of the present invention has an oxygen content of less than or equal to about 5 wt % because of the surface oxidizing groups relative to a carbon backbone.

A heterogeneous mixture of GO, and RGO and a conventional material has recently evoked active interest, and this may improve synergic effects between materials exceeding a limit of the conventional material. The heterogeneous mixture may be used in a high strength composite material and a fuel cell. In certain examples, a graphene-nanowire (semiconductor) hybrid structure where light energy is absorbed in a graphene conductive part and electron-hole pairs are generated (KR 10-2012-0092431 A), a hybrid composite manufacturing method including graphene sheet/carbon nanotube/a polymer nanoparticle (KR 10-2012-0053399 A), a method of manufacturing a positive electrode graphene material for a lithium rechargeable battery that is a hybrid material formed by adding an Fe precursor and a $PO_4$ precursor (KR 10-2012-0035659 A), a method of manufacturing a graphene composite calcinated body having an excellent charge and discharge ratio by sintering graphene and a metal oxide particle in air (U.S. Pat. No. 8,257,867), a method of manufacturing a graphene-$TiO_2$ hybrid material by mixing a $TiO_2$ nanopowder with graphene at a high temperature and high pressure and reacting them (US 2012-0149554 A), a method of manufacturing a graphene ceramic composite (KR 2012-0039799A, and KR 2013-0014327A), and the like have been explored.

In addition, Publication Laid-open KR 10-2012-0039799 discloses a technology of improving coating properties of graphene itself by directly chemically bonding a ceramic precursor with a carboxyl group (—COOH) on the edge of GO to improve dispersion. For example, the graphene itself is coated on the edge of the GO through a chemical bond and may induce high electrical conductivity. However, the coating may be weak, since there is no binder between the GO and the coated graphene layer. Publication Laid-open KR10-2013-0014327 also discloses a method of making a graphene composite by mixing a salt type (e.g., chloride) ceramic precursor with graphene or a graphene oxide and then, calcinating the mixture at a high temperature. However, when the ceramic and the graphene have a directly chemical bond, the sheet-shaped structure of the graphene itself is broken, and the graphene may lose inherent properties.

This problem becomes severe, particularly when the ceramic is oxide, since a carbon component in the graphene is bonded with an oxygen component in the ceramic and released as gas such as CO and $CO_2$, leaving a carbon residue as a particle. When an oxide ceramic precursor or oxide ceramic sol is calcinated with graphene, there is a similar problem to the above.

In addition, when graphene is reacted at a low temperature that the graphene has no reaction with oxygen without calcination in order to reduce the problem, there is a stripping problem due to severe deterioration of an interface bond between oxide ceramic and graphene. In other words, hydrophobicity of the graphene may resist against hydrophilicity of the ceramic.

In general, when a ceramic film is formed by coating ceramic sol and gelating it, the film may be destroyed due to evaporation of a solvent and an osmotic pressure during the drying. Meanwhile, when graphene is used to form a hybrid film, the hybrid film including the graphene in an appropriate concentration is actually difficult to form due to diffusion of the graphene into a solvent and prevention of drying (non-uniform drying since a graphene layer is positioned on the surface and prevents movement and diffusion of the solvent).

The hybrid film has difficulty in terms of commercial availability, since the graphene is hardly dispersed layer by layer in a solid-phase matrix to realize properties of a graphene-containing composite. In addition, a specific process example has not been provided yet.

Accordingly, in order to solve the problems, a method of reducing a metal precursor at room temperature to powder it and platting and sputtering graphene to manufacture composite powder or a composite layer has been suggested, and another method of using a polymer resin in an entire amount to avoid the fundamental problem of a ceramic composite is mostly used.

However, the above graphene composite materials are not sufficiently dispersed, and the polymer resin also has a drawback of sharply deteriorating thermal conductivity of the graphene and durability of the film.

SUMMARY OF THE INVENTION

In preferred aspects, the present invention provides a graphene-containing coating film having improved thermal conductivity and surface functionality (hydrophilicity) and a method of preparing the same.

In one aspect, provided is a graphene-containing coating film. The coating film may comprise: at least one hydrate represented by Chemical Formula 1, graphene positioned on the surface, particularly in a shape of discontinuous island, of the hydrate represented by Chemical Formula 1, and a silica particle positioned on the surface of the hydrate of Chemical Formula 1 and positioned on the surface of the graphene in a shape of discontinuous island. In particular, the silica particle may include agglomeration of a plurality of silica nanoparticles.

$$X_n\text{-M-(OH)}_{4-n} \quad \text{[Chemical Formula 1]}$$

In Chemical Formula 1,

M is selected from the group consisting of Si, Ti, Ag, Sn, In, and Zn, or a combination thereof, X is: a) a C1 to C30 alkyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group; b) a C1 to C30 alkenyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group; or c) a C1 to C30 alkynyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group, and n is an interger of 1 to 3.

The "silica nanoparticles" as used herein refer to particles made of silica or substantially homogeneous silica and the particles may have average size less than about 990 nm, less than about 900 nm, less than about 800 nm, less than about 700 nm, less than about 600 nm, less than about 500 nm, or less than about 400 nm. The graphene-containing coating film may include: 1) a first region including the hydrate represented by Chemical Formula 1 and the silica particle bound with each other; and 2) a second region including the hydrate represented by Chemical Formula 1, the graphene and the silica particle bound with one another.

An average diameter of the silica particle of the first region may be from about 5 nm to about 50 nm, and an average diameter of the silica particle of the second region may be from about 5 nm to about 25 nm.

An average diameter of the silica nanoparticle may be from about 5 nm to about 30 nm. A thickness of the graphene may be from about 0.4 nm to about 5 nm. A major axis length of the graphene may be from about 100 nm to about 10,000 nm, and a minor axis length of the graphene may be from about 100 nm to about 900 nm.

An amount of the graphene may be from about 0.001 wt % to about 50 wt % based on the total weight of the hydrate represented by Chemical Formula 1, the graphene, and the silica nanoparticle.

When transmittance is greater than or equal to about 70%, the an amount of the graphene may be from about 0.001 wt % to about 3 wt % based on the total weight of the hydrate represented by Chemical Formula 1, the graphene, and the silica nanoparticle.

The "transmittance" as used herein refers to a fraction (%) of the light transmitted through the graphene-containing coating film film from the initially radiated light. The wavelength of the light transmitted the film is not particularly limited, but the transmittance may be measured with the light having the wavelength within infrared, visible light or ultraviolet (UV) light regions. For instance, the transmittance of the film may be measured at visible light regions at the wavelength of about 400 nm to 700 nm.

The graphene-containing coating film may have a thickness of about 100 nm to 2 μm.

When transmittance is greater than or equal to about 70%, the graphene-containing coating film may have a thickness of about 200 nm to 500 nm.

The Chemical Formula 1 may be represented by one of Chemical Formulae 1-1 to 1-3.

$$X^1\text{-M-(OH)}_3 \quad \text{[Chemical Formula 1-1]}$$

$$X^1X^2\text{-M-(OH)}_2 \quad \text{[Chemical Formula 1-2]}$$

$$X^1X^2X^3\text{-M-(OH)} \quad \text{[Chemical Formula 1-3]}$$

In Chemical Formulae 1-1 to 1-3,

M is selected from the group consisting of Si, Ti, Ag, Sn, In, and Zn, or a combination thereof, $X^1$, $X^2$, and $X^3$ are each independently a) a C1 to C30 alkyl group substituted or unsubstituted with at least one functional group selected from an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group;

b) a C1 to C30 alkenyl group substituted or unsubstituted with at least one functional group selected from an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group; or c) a C1 to C30 alkynyl group substituted or unsubstituted with at least one functional group selected from an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group.

Preferably, M may be Si or Ti.

The graphene-containing coating film may further include an additive selected from the group consisting of an inorganic powder, an organic additive, and a combination thereof.

The inorganic powder may have an average diameter of about 5 nm to 50 nm.

In another aspect, provided is a method of preparing a graphene-containing coating film. The method may comprise: dispersing a graphene; mixing and dispersing a silica nanoparticle and the precursor of the hydrate represented by Chemical Formula 1 in a hydrophilic solvent and mixing the same with the dispersed graphene; performing hydrolysis and condensation reactions of the mixed dispersed solution to prepare a graphene-containing sol solution; coating the graphene-containing sol solution on a substrate and drying the same at a temperature of about 25° C. to 400° C.; and heat-treating the dried film at a temperature of about 50° C. to 900° C.

The silica nanoparticle may be present in an amount of about 5 to 20 wt % based on the total amount of the mixed dispersed solution; the precursor of the hydrate represented by Chemical Formula 1 may be present in an amount of about 10 to 40 wt % based on the total amount of the mixed dispersed solution; the dispersed graphene may be present in an amount of about 0.001 to 15 wt % based on the total amount of the mixed dispersed solution; and the hydrophilic solvent may be present in a balance amount.

The graphene may dispersed by mechanical disperse treatment, or a solvent exchange method.

Preferably, the solvent exchange method may include: preparing dispersion by mixing a graphene powder, a first dispersing agent and a first non-aqueous based solvent; preparing a mixture by adding a second non-aqueous based solvent and a precursor of the hydrate to the dispersion; preparing a graphene-containing sol solution by mixing the mixture with a second dispersing agent and water.

In the process of the mixing and dispersing of a silica nanoparticle and the precursor of the hydrate represented by Chemical Formula 1 in a hydrophilic solvent and mixing the same with the dispersed graphene, an additive selected from the group consisting of an inorganic powder, an organic additive, and a combination thereof may be further included.

The inorganic powder may be mixed in an amount of about 5 parts by weight to 30 parts by weight based on 100 parts by weight of the mixed dispersed solution.

The organic additive may be mixed in an amount of about 0.01 parts by weight to 10 parts by weight based on 100 parts by weight of the mixed dispersed solution.

Preferred precursors of the hydrate represented by Chemical Formula 1 may be, for example, selected from the group consisting of trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, glycidoxypropyltrimethoxysilane, glycidoxypropyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, (N,N-dimethylaminopropyl)trimethoxysilane, (N,N-dimethylaminopropyl)triethoxysilane, and N,N-{(2-aminoethyl) (3-aminopropyl)}trimethoxysilane, or a combination thereof.

Further provided are vehicle parts that comprising the graphene-containing coating film as described above. Such vehicle parts may include a head lamp of a vehicle.

The present invention also includes vehicles that comprise a vehicle part such as a head lamp that comprises the graphene-containing coating film as described herein.

The present invention may provide a graphene-containing sol solution having improved stability and dispersability. In particular, the graphene-containing coating film may have improved dispersion of graphene, an interface bond, graphene stability, and surface functionality. Further provided are vehicle parts such as a head lamp of a vehicle comprising the graphene-containing coating film as described herein.

Also provide are vehicles that comprise the vehicle parts such as a head lamp that comprises the graphene-containing coating film as described herein.

DESCRIPTION OF SYMBOLS

Figure 1:
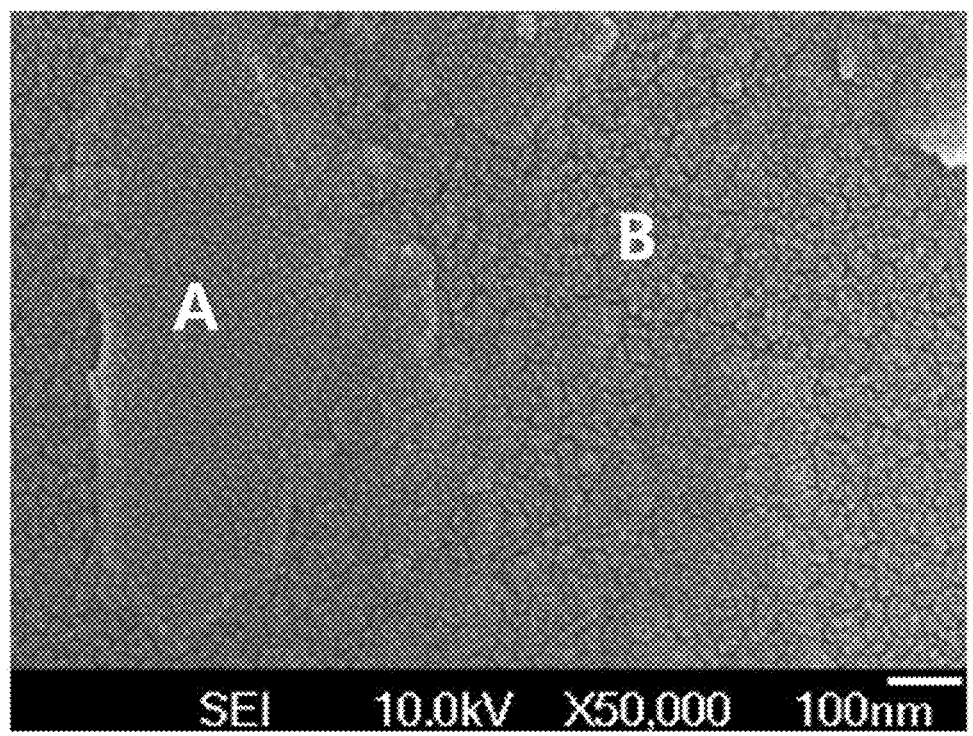
FIG. 1 shows a FE-SEM photograph of an exemplary graphene-containing coating film according to an exemplary embodiment of the present invention.

10: ceramic sol
20: graphene
30: silica nanoparticle

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, embodiments of the present invention are described in detail. However, these embodiments are exemplary, and this disclosure is not limited thereto.

An graphene-containing coating film according to an exemplary embodiment may comprise: at least one hydrate represented by Chemical Formula 1, a graphene positioned in a shape of discontinuous island on the surface of the hydrate represented by Chemical Formula 1 and a silica particle positioned on the surface of the hydrate of Chemical Formula 1 and positioned on the surface of the graphene in a shape of discontinuous island. In particular, the silica particle may include agglomeration of a plurality of silica nanoparticles.

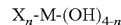

[Chemical Formula 1]

In Chemical Formula 1,

M is selected from the group consisting of Si, Ti, Ag, Sn, In, and Zn, and a combination thereof, X is: a) a C1 to C30 alkyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group; b) a C1 to C30 alkenyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group; or c) a C1 to C30 alkynyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group.

n is an integer of 1 to 3.

The hydrate represented by Chemical Formula 1 may be stably bound to the interface of the silica nanoparticle and the graphene in a hydrophilic sol solution because an organic functional group of the hydrate is fused with a hydrophilic group of the hydrophilic sol solution due to at least one organic functional group represented by "X". These may be stable during drying and heat-treating processes, and have buffering effect even an excess amount of an organic additive and an organic additive, forming a stable film.

The functional group of the hydrate may have hydorphilic characteristics, for example an epoxy group, a ketone group, a carboxyl group, a hydroxy group, an amino group, an amine group (e.g., primary, secondary, or tertiary amine), a thiol group, a phosphoric acid group, a halide group (e.g., F, Cl, Br, or I), an ester group, or an alkyl group, an alkenyl group, or an alkynyl group including O, S, P, N, Si, and the like in the backbone, or a salt of an organic or inorganic material.

X is not particularly limited to a size of a molecular weight. However, when being an oligomer, a macromolecule or a polymer, X may bind neighboring molecules by a hydrated functional group therein being capable of inducing a second, a third sol-gel reaction, that is —Si—OH, —Si(OH)$_2$, or —Si(OH)$_3$ and may spread a sol-gel reaction.

Examples of the organic functional group of X may be a substituted or unsubstituted C1 to C30 alkyl group; C1 to C30 alkenyl group; or C1 to C30 alkynyl group substituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group and a substituted or unsubstituted C1 to C10 silyl group.

By stating herein that a particular group may be "substituted or unsubstituted" means that the group may be optionally substituted at one or more available positions by groups such as, for example, an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group and a substituted or unsubstituted C1 to C10 silyl group.

The Chemical Formula 1 may be represented by one of Chemical Formulae 1-1 to 1-3.

$X^1\text{-M-(OH)}_3$ [Chemical Formula 1-1]

$X^1X^2\text{-M-(OH)}_2$ [Chemical Formula 1-2]

$X^1X^2X^3\text{-M-(OH)}$ [Chemical Formula 1-3]

In Chemical Formulae 1-1 to 1-3, $X^1$, $X^2$ and $X^3$ may be the same as X, or may be different.

M may be selected from the group consisting of Si, Ti, Ag, Sn, In, and Zn, and a combination thereof. Preferably, M may be Si or Ti.

In an exemplary embodiment, when the M is Si, exemplary precursors of silicon-based compounds may be selected from the group consisting of trimethoxysilane, triethoxysilane, methyltrimethoxysilane, methyltriethoxysilane, ethyltrimethoxysilane, ethyltriethoxysilane, prop yltrimethoxysilane, prop yltriethoxysilane, isobutyltriethoxysilane, glycidoxypropyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane and diphenyldiethoxysilane, (N,N-dimethylaminopropyl)trimethoxysilane, (N,N-dimethylaminopropyl)triethoxysilane, and N,(2-aminoethyl)(3-aminopropyl)trimethoxysilane, or combinations thereof, but are not limited thereto.

In addition, the silicon-based compounds may be precursors that have a M-OR bond (alkoxy bond) with other metal, M, or a M-OOR bond (ester bond).

Figure 3:
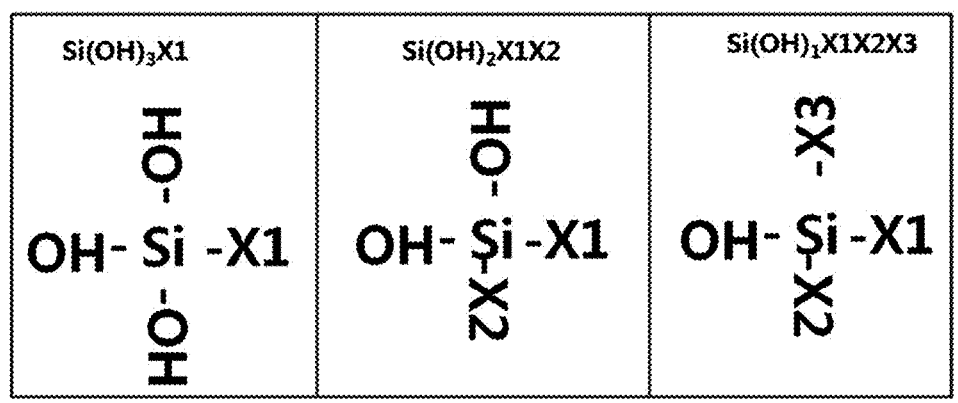
FIG. 3 shows various forms of hydrate included in an exemplary coating composition for forming an exemplary graphene-containing sol according to an exemplary embodiment of the present invention.

Preferably, the hydrate represented by Chemical Formula 1 may be a hydrolyzed ceramic precursor, for example $X^1\text{-Si-(OH)}_3$, $X^1X^2\text{-Si-(OH)}_2$, $X^1X^2X^3\text{-Si-(OH)}$ and the like as shown in FIG. 3. Herein, when an organic material component, a precursor reagent including $X^1$, $X^2$, and $X^3$ is hydrolyzed, modified groups (chemical modificatin, or formation of a complex, or a salt) of $X^1$, $X^2$ and $X^3$, interface properties with graphene may be improved and organic materials may first react with carbon of the graphene, protecting graphene.

The $X^1$, $X^2$, and $X^3$ may be the same or different.

Figure 4:
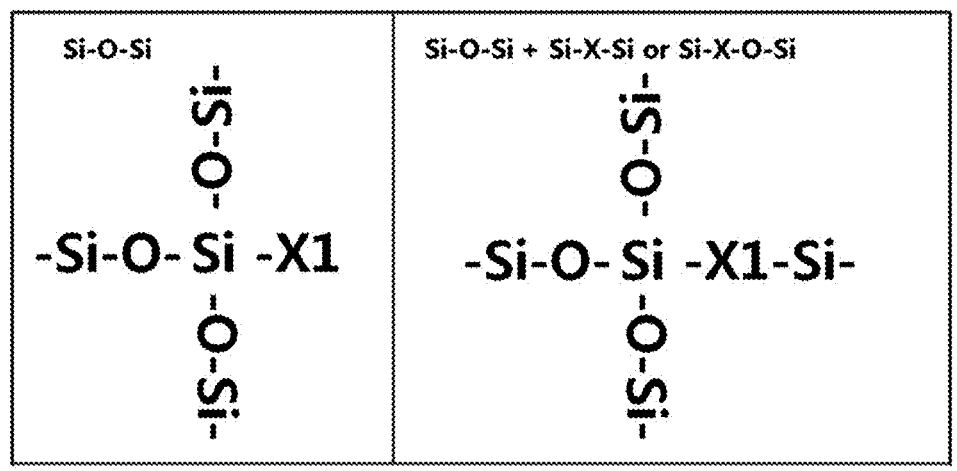
FIG. 4 shows the condensed form of an exemplary hydrate precursor in an exemplary graphene-containing coating film according to an exemplary embodiment of the present invention.

During formation of the graphene-containing coating film, $X^1$, $X^2$, and $X^3$ may be polymerized (forming a network) as shown in FIG. 4. It may have a condensed form where a —Si—O—Si-bond is formed, and substituent moieties of $X^1$, $X^2$, and $X^3$ may provide a —Si- and —O—Si-bond. Particularly, when a X moiety includes an organic functional group such as an epoxy group, a hardener may be used to cure the X moiety.

The hardener may cure a curable resin, and the curing may be performed by a reaction using a catalyst, or crosslinking by a hardener.

The hardener is not particularly limited, and may be any commercial compound for a hardener of a general epoxy resin. For example, the hardener may be selected from the group consisting of an amine-based compound, an amide-based compound, an acid anhydride-based compound, a phenol-based compound and the like. Specifically, the amine-based compound may be diaminodiphenylmethane, ethylenediamine, diethylenetriamine, triethylenetetramine, diaminodiphenylsulfone, isophoronediamine, imidazole, BF3-amine a complex, guanidine derivative, and the like, the amide-based compound may be dicyandiamide, a polyamide resin synthesized from a linolenic acid dimer ethylenediamine, an acid anhydride-based compound, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride, and the like, the phenol-based compound may be a polyvalent phenol compound such as a phenolnovolac resin, a cresolnovolac resin, an aromatic hydrocarbon formaldehyde resin a modified phenol resin, a dicyclopentadienephenol addition-type resin, a phenolararkyl resin (xylok resin), a polyvalent phenolnovolac resin synthesized from a polyvalent hydroxy compound and formaldehyde such as resorcin novolac resin, a naphtholararkyl resin, a trimethylolmethane resin, a tetraphenylolethane resin, a naphtholnovolac resin, a naphthol-phenol cocondensed novolac resin, a naphthol-cresol cocondensed novolac resin, a biphenyl modified phenol resin (a polyvalent phenol compound including a bismethylene group linked to a phenolic nucleus), a biphenyl modified naphthol resin (a polyvalent naphthol compound including a bismethylene group linked to a naphtholic nucleus), a aminotriazine modified phenol resin (a polyvalent phenol compound including melamine, benzoguanamine, and the like linked to phenolic nucleus by a methylene bond) or an alkoxy group-containing aromatic ring modified novolac resin (a polyvalent phenol compound including a phenolic nucleus and alkoxy group-containing aromatic ring linked to formaldehyde) and mixtures thereof.

In an epoxy resin composition of the present invention, amounts of an epoxy resin and a hardener are not particularly limited, but active groups of the hardener may be preferably used in about 0.7 to 1.5 equivalents based on 1 equivalent of the sum of epoxy groups of an epoxy resin.

For example, in the case of glycidoxypropyltriethoxysilane, a hardener such as ethylene diamine may be used for an epoxy group that is an organic functional group of X moieties.

The graphene may be positioned in a shape of discontinuous island on the surface of the hydrate represented by Chemical Formula 1, and a silica particle including a plurality of silica nanoparticle may be agglomerated and positioned on the surface of the graphene.

The "shape of discontinuous island" means that a plurality of island shapes are discontinuously arranged, and the island shape refers to a spherical, semispherical, non-spherical, or amorphous shape having a volume, but it is not limited to these specific shapes.

The graphene may improve thermal conductivity, and may be positioned in a shape of discontinuous island, that is a thin and wide sheet-shape on the surface of the hydrate represented by Chemical Formula 1, and thus stability may increase at the interface between the hydrate represented by Chemical Formula 1 and graphene and at the interface between the graphene and the silica nanoparticle.

Particularly, since the silica particles on the surface of the graphene has relatively dense agglomeration relative to silica particle on the surface of the hydrate represented by Chemical Formula 1, a small amount of grain boundaries between the particles may be distributed, and thus it may have a favorable structure for providing characteristics near to hyperhydorphilicity and improved thermal conductivity characteristics.

A thickness of the graphene may be from about 0.4 nm to 5 nm, from about 0.4 nm to about 4 nm, or particularly from about 0.4 nm to about 2.8 nm.

The graphene may have a thickness of about 4 nm, when it has about 10 layers at maximum and a thickness of about 2.8 nm, when it has about 7 layers at maximum.

A major axis length of the graphene may be from about 100 nm to about 10,000 nm, and a minor axis length of the graphene may be from about 100 nm to about 900 nm.

Particularly, the major axis length may be from about 100 nm to about 2,000 nm, and the minor axis length may be from about 100 nm to about 500 nm.

When the graphene has the above thickness and size, hydrophilicity and thermal conductivity of the graphene-containing coating film may be improved, and further hyperhydrophilicity may be provided.

Preferably, the graphene of the present invention may be a sheet-shaped material having a BASAL plane with a thickness of an atom/molecule to a nano unit, for example, graphene oxide (graphite oxide) consisting of sheet-shaped BASAL planes comprising carbon, rGO (reduced graphene oxide), and a graphene nanoplate (stripped expanded graphite) and further, modified graphene oxide (modification of a substituent, a derivative, a combination with a third material, and like) or doped graphene oxide.

The graphene of the present invention may be manufactured by preparing graphene oxide (commonly called to be GO), radiating energy into the graphene oxide (using a microwave, a photon, IR, a laser, and the like) or reducing the GO in a liquid phase, a gas phase, and a solid-phase. Herein, the reduction includes thermal reduction and chemical reduction.

In addition, the graphene may be stripped layer by layer after being dipped in a solvent having excellent affinity with with graphite and then, treated by an ultrasonic wave and the like. The solvent having excellent affinity with graphite may representatively include GBL, NMP, and the like. The graphene obtained in this method can have good quality but difficulty in a mass production.

In addition, the graphene may be obtained from a chemical synthesis method, a bottom production method, a method of chemically spliting carbon nanotube and folding it, and the like. Further, the graphene may be obtained from a solvent-stripping method of graphite, a mechanically-grinding method of graphite (ultrasonic wave, milling, a gasphase high speed blading method, an electrical stripping method, a synthesis method, and the like.

On the other hand, oxidizing groups on the surface of the graphene may be completely removed by any currently-known method, and an oxygen content by the oxidizing groups on the surface of the graphene except for GO may be less than or equal to about 5 wt % based on the amount of a carbon backbone. In the present invention, unless otherwise indicated, 'graphene' is defined when the oxygen content by oxidizing groups on the surface is even less than or equal to about 5 wt % based on the amount of a carbon backbone.

In the present invention, all the above forms are uniformly called as graphene.

In the present invention, highly dispersed graphene is used, and a method of dispersing graphene is described in connection with a manufacturing method later.

The graphene-containing coating film may include 1) a first region including the hydrate represented by Chemical Formula 1 and the silica particle bound with each other; and 2) a second region including the hydrate represented by Chemical Formula 1, the graphene and the silica particle bound with one another.

A structure of the graphene-containing coating film according to an exemplary embodiment of the present invention can be described referring to FIG. 1.

FIG. 1 shows a FE-SEM photograph of an exemplary graphene-containing coating film according to an exemplary embodiment of the present invention.

Referring to FIG. 1, an A region corresponds to the second region, and a B region corresponds to the first region.

The first and second regions may be distinguished by a silica particle shape on the mostouter surface.

The silica particle may comprise silica nanoparticles mostly having an average diameter ranging from about 5 nm to about 30 nm, the silica nanoparticles may be agglomerated and variously shape the silica particle. The shape of the particle may be determined depending on a region where these silica nanoparticles are present, that is, a region where these silica nanoparticles are present on the surface of hydrate or where these silica nanoparticles are present on the surface of graphene. The silica nanoparticle may have an average particle diameter ranging from about 5 nm to about 30 nm, or particularly, from about 7 nm to about 25 nm, and accordingly, the present invention may use a silica nanoparticle having, for example, an average particle diameter of about 7 nm, about 15 nm, or about 25 nm.

When the silica nanoparticle has an average particle diameter of greater than about 30 nm, the silica nanoparticle may not be sufficiently attached to a coating film formed from a hybrid sol solution but make the surface of the coating film rough and increase a waterdrop contact angle and thus cause an adverse effect of reducing hydrophilic characteristics.

The first region, in particular, is a region where graphene may not be protruded on the surface and where the silica particle may be directly bonded on the surface of the hydrate represented by Chemical Formula 1.

The silica particle of the first region may have an average diameter of about 5 nm to 50 nm, or particularly of about 10 nm to 50 nm, for example, of about 10 nm to 30 nm.

The silica particle of the first region includes a plurality of grain boundary that may be relatively widely distributed between silica particles while maintaining large and round shape.

On the other hand, the second region may be a region where graphene is protruded on the surface and where graphene is bonded on the surface of the hydrate represented by Chemical Formula 1 and the silica particle is bonded on the surface of the graphene.

The silica particle of the second region may have an average diameter of about 5 nm to 25 nm, or particularly of about 5 nm to 20 nm, for example, of about 5 nm to 15 nm.

The silica particles present in the second region may be densely agglomerated and distributed with a relatively small grain boundary among themselves.

Since the second region where the silica particles formed of densely agglomerated silica nanoparticles is present in the graphene-containing coating film, a waterdrop contact angle may be formed advantageously for hydrophilicity, and thermal conductivity may be improved by graphene included in the second region.

In addition, the graphene included in the second region has a wide and thin sheet-shape and thus may improve bodinging stability on the interface and stability of the graphene-containing coating film.

An amount of the graphene in the graphene-containing coating film may be from about 0.001 wt % to about 50 wt %, from about 0.001 wt % to about 30 wt %, or particularly from about 0.001 wt % to about 15 wt % based on the total weight of the hydrate represented by Chemical Formula 1, the graphene, and the silica nanoparticle.

Highly uniformly dispersed graphene may be used. For example, the amount of the graphene may be increasingly included up to about 30 wt % at most in the hybrid coating film by an interaction of the graphene with hydrophilic groups present in an organic functional group of the hydrate represented by Chemical Formula 1 and and the silica nanoparticle. Alternatively, the amount of the graphene may be increasingly included up to about 50 wt % at most by adding an additive such as a dispersing agent and the like.

The graphene included in the graphene-containing coating film may improve strength and thermal conductivity of a coating film. However, when the graphene is included in a predetermined level, moisture contained in the graphene may cause non-uniformity of a graphene-ceramic mixture and thus a bonding problem on the interface, failing in obtaining a coating film with a smooth and uniform surface.

Accordingly, the present invention is to improve strength and thermal conductivity of a coating film without a bond on the interface despite addition of graphene beyond a predetermined level.

The additive may be selected from the group consisting of an inorganic powder, an organic additive, and a combination thereof.

The inorganic powder may be further included to apply film functionalities such as stability (a composite effect) and hyperhydrophilicity to the coating film.

Most preferable example of the inorganic powder may be a ceramic particle, and examples of the ceramic particle may be $SiO_2$, $Al_2O_3$, $Li_4Ti_5O_{12}$, $TiO_2$, $SnO_2$, $CeO_2$, $ZrO_2$, $V_2O_5$, $B_2O_3$, $BaTiO_3$, $Y_2O_3$, $WO_3$, MgO, CuO, ZnO, $AlPO_4$, AlF, $Si_3N_4$, AlN, TiN, WC, SiC, TiC, $MoSi_2$, $Fe_2O_3$, $GeO_2$, $Li_2O$, MnO, NiO, zeolite, hollow ceramics, and the like, but are not limited thereto.

The ceramic particle may be applied to graphene to obtain a graphene-ceramic composite powder in a method of graphene-metal precursor reduction, graphene-ceramic precursor heat treatment, plating, substitution, sputtering, and the like.

The inorganic powder may have a diameter of about 5 nm to 50 nm, of about 5 nm to 30 nm, or particularly of about 7 nm to 25 nm, for example about 10 nm to 20 nm.

When the diameter is out of the range, film properties may be deteriorated.

The organic additive may be further included to improve dispersion, coating properties, stability, adherence, leveling, viscosity, coating film property, drying property, and the like.

The organic additive may be hardeners, resin binders, monomers, a dispersing agents, dispersion stabilizers, surfactants, polyimide precursors, organic solvents, amphiphilic solvents, hydrophilic solvents, oils, acids, bases, salts, ions, leveling agents, adhesives, silane coupling agents, thermoplastic resins, conductive polymers, or combinations thereof, but is not limited thereto.

For example, the resin binders may be thermosetting resins such as urethane resins, epoxy resins, melamine resins, polyimide, and a mixture thereof. In addition, the resin binders may be photocurable resins such as epoxy resins, polyethylene oxide, urethane resins, and mixtures thereof. Further, the resin binders may be polymers of which reactive oligomers are epoxy acrylate, polyester acrylate, urethane acrylate, polyether acrylate, thiolate, organic silicon polymers, organic silicon copolymers and mixtures thereof; polymers of which reactive monomers are mono-functional monomers of 2-ethylhexylacrylate, octyldecylacrylate, isodecylacrylate, tridecylmethacrylate, 2-phenoxyethylacrylate, nonylphenolethoxyatemonoacrylate, tetrahydrofurfurylate, ethoxyethylacrylate, hydroxyethylacrylate, hydroxyethylmetaacrylate, hydroxypropylacrylate, hydroxypropylmetaacrylate, hydroxybutylacrylate, hydroxybutylmetaacrylate, and the like;

polymers of which reactive monomers are bi-functional monomers of 1,3-butanedioldiacrylate, 1,4-butanedioldiacrylate, 1,6-hexanedioldiacrylate, diethylene glycoldiacrylate, triethylene glycoldi methacrylate, neopentylglycoldiacrylate, ethylene glycoldimethacrylate, tetraethylene glycolmethacrylate, polyethylene glycoldimethacrylate, tripropylene glycoldiacrylate, 1,6-hexanedioldiacrylate and mixtures thereof; polymers of which reactive monomers are tri-functional monomers of trimethylolpropanetriacrylate, trimethylolpropanetrimethacrylate, pentaerythritoltriacrylate, glycidylpentatriacrylate, glycidylpentatriacrylate, and a mixture thereof; or polymers of which photoinitiators are benzophenone-based, benzyldimethylketal-based, acetophenone-based, or anthraquinone-based photoinitiators and mixtures thereof, Further, examples of monomers may be thermosetting monomers, UV curable monomers, chemically curable monomers, and the like.

The dispersing agent and the dispersion stabilizer may include, but not be particularly limited to, Triton X-100, polyethyleneoxide, polyethyleneoxide-polypropyleneoxide copolymer, polyvinylpyrrole, polyvinyl alcohol, Ganax, starch, monosaccharides, polysaccharides, sodium dodecylbenzene sulfate, sodium dodecyl benzene sulfonate (NaDBS), sodium dodecylsulfonate (SDS), cetyltrimethylammounium 4-vinylbenzoate, pyrene-based derivative(pyrene derivatives), gum arabic (GA), Nafion, and mixture thereof, and other surfactants may be LDS (Lithium Dodecyl Sulfate), CTAC (Cetyltrimethyl Ammonium Chloride), DTAB (Dodecyl-trimethyl Ammonium Bromide), nonionic C12E5 (Pentaoxoethylenedocyl ether), polysaccharide (Dextrin), PEO (Poly Ethylene Oxide), Gum Arabic (GA), EC (ethylene cellulose), commercial BYK, block copolymer, BTK-Chemie, Germeny), leveling agents, and the like, The silane coupling agents may be compounds being capable of forming $Si(OH)_4$ through hydrolysis and then, condensation reactions, and may be selected from: a) tetraalkoxysilanes such as tetramethoxysilane, tetraethoxysilane, tetra-n-propoxysilane, tetra-i-propoxysilane, tetraisopropoxysilane, tetra-n-butoxysilane, tetra-sec-butoxysilane, tetra-tert-butoxysilane and mixtures thereof; trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatepropyltrimethoxysilane, 3-isocyanatepropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane, 3-ureidopropyltriethoxysilane, and mixtures thereof; b) dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane and mixtures thereof; and c) mixtures thereof. These may act as dispersion stabilizers.

Thermoplastic resins may be selected from the group consisting of polystyrene and a derivative thereof, polystyrene butadiene copolymer, polycarbonate, polychloridevinyl, polysulfone, polyethersulfone, polyetherimide, polyacrylate, polyester, polyimide, polyamic acid, cellulose acetate, polyamide, polyolefin, polymethylmethacrylate, polyetherketone, polyoxyethylene, and mixtures thereof. Further, the conductive polymers may be selected from the group consisting of polythiophene-based homopolymer, polythiophene-based copolymer, polyacetylene, polyaniline, polypyrrole, poly (3,4-ethylenedioxythiophene), pentacene-based compounds, and mixtures thereof.

In addition to the inorganic powder and the organic additive, in order to improve film functionality, other additives such as an antioxidant, carbon nanotube, metal nanowire (e.g., silver nanowire), metal flake, nanoparticle, metalnanoparticle, fullerene, a semiconductor nanoparticle, a semiconductor nano wire, a semiconductor nanoplate, and quantum dot may be added as needed.

When transmittance increases up to greater than or equal to about 50% in order to improve transparency of the graphene-containing coating film, an amount of the graphene may be about 0.001 wt % to 5 wt % based on the total weight of the hydrate represented by Chemical Formula 1, the graphene, and the silica nanoparticle.

When transmittance increases up to greater than or equal to about 70%, an amount of the graphene may be of about 0.001 wt % to 3 wt % based on the total weight of the hydrate represented by Chemical Formula 1, the graphene, and the silica nanoparticle.

In order to increase transparency, graphene should be less used but may be used in an amount of about 3 wt % to 5 wt % uniformly dispersed in a coating film, while transparency is maintained in a predetermined level or high. Accordingly, a graphene-containing coating film according to the present invention may have excellent transparency as well as excellent thermal conductivity.

Figure 2A:
FIGS. 2A-2B show exemplary graphene-containing coating films according to Example 1 (FIG. 2C), and Comparative Examples 1 (FIG. 2A) and 2 (FIG. 2B).
Figure 2B:
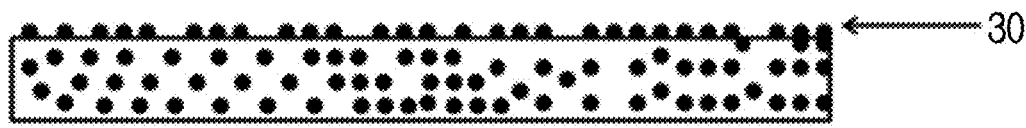

FIGS. 2A-2B show exemplary graphene-containing coating compositions according to an exemplary embodiment of the present invention.

Figure 2C:
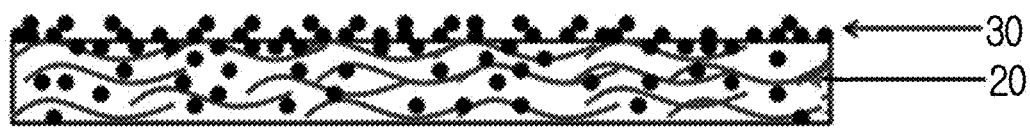

FIG. 2A relates to a coating composition obtained by adding graphene 20 to an organic ceramic sol 10 according to Comparative Example 1, FIG. 2B relates to a coating composition obtained by adding only a silica nanoparticle 30 without graphene to an organic ceramic sol 10 according to Comparative Example 2, FIG. 2C relates to a coating composition obtained by further adding the silica nanoparticle 30 as an additive to the ceramic sol 10 of the (a) according to Example 1 in an exemplary embodiment of the present invention.

FIG. 2A and FIG. 2C show improvement of thermal conductivity due to graphene included in a ceramic component having very low thermal conductivity.

Particularly, the FIG. 2C shows that the coating composition including only nanoparticle without graphene forms a film having a rough surface as compared with the coating composition of the FIG. 2B. The rough surface may be caused when the nanoparticle is laid on the curved or winkled graphene and thus activates its surface function. This surface form may improve hydrophilicity or water repellency, bring about an effect of increasing a haze and enlarging the surface area of the surface area, and the like.

The graphene-containing organic-inorganic ceramic hybrid coating film may have a thickness of about 100 nm to 2 µm, or particularly of about 200 nm to 900 nm.

When the coating film has a thickness within the range, uniformity and stability of a film surface may be ensured.

When transmittance increases up to greater than or equal to about 70% in order to improve transparency transmittance, a thickness of the graphene-containing coating film may be from about 200 nm to about 500 nm.

A substrate for supporting the coating film may be a substrate made of an inorganic material of glass or quartz, a silicon substrate and the like; or a resin substrate of polyethylene terephthalate (PET), polyethylene naphthalate (PEN), polycarbonate (PC), cycloolefin polymer (COP), polymethyl methacrylate (PMMA), polystyrene (PS), polyimide (PI), polyarylate, and the like.

In the present invention, the substrate may be used as a large area substrate, a curved substrate, and the like regardless of a kind or shape thereof.

A method of preparing a graphene-containing coating film according to an exemplary embodiment may include: dispersing a dispersed graphene; mixing and dispersing a silica nanoparticle and the precursors of the hydrate represented by Chemical Formula 1 in a hydrophilic solvent and mixing the same with the dispersed graphene; performing hydrolysis and condensation reactions of the mixed dispersed solution to prepare a graphene-containing sol solution; coating the graphene-containing sol solution on a substrate and drying the same at a temperature of about 25° C. to 400° C.; and heat-treating the dried film at a temperature of about 50° C. to 900° C.

The silicananoparticle may be present in an amount of about 5 to 20 wt % based on the total amount of the mixed dispersed solution; the precursors of the hydrate represented by Chemical Formula 1 may be present in an amount of about 10 to 40 wt % based on the total amount of the mixed dispersed solution; the dispersed graphene may be present in an amount of about 0.001 to 15 wt % based on the total amount of the mixed dispersed solution; and the hydrophilic solvent may be present in a balance amount.

A uniform coating composition may be prepared by respectively dispersing graphene, a silica nanoparticle, and a precursor mixed solution of hydrate represented by Chemical Formula 1 and mixing them. Accordingly, the silica nanoparticles or ceramic precursor molecule species corresponding to the hydrate may be dispersed at most into the graphene of a sheet-shaped nano structure and adsorbed therein.

The dispersed graphene may be prepared by a mechanical dispersion treatment or a solvent exchange method, Herein, commercially available aqueously-dispersed graphene may be used as the dispersed graphene without a separate process.

The mechanical dispersion treatment may be performed about dry graphene powder, and the dry graphene powder may be obtained by heat-treating graphene oxide (GO) or chemically reducing the graphene oxide an then, drying the obtained graphene or heat-treating it again. This graphene powder may be very highly agglomerated and may be dispersed in physical, chemical, and mechanical methods. Representatively, the dispersion may be performed by ultrasonicating with an ultrasonic wave, stiffing, application of shear stress and shearing force, using a homogenizer and a bead ball, or a combination thereof.

The solvent exchange method may also be applied to wet graphene, and graphene obtained in a hydrazine reduction method and the like may be wet in water, and moisture that is firmly adsorbed in the graphene may be removed through a strong heat treatment. However, since the strong heat treatment may cause a severe problem of agglomerating the graphene, the graphene needs to be dispersed again into a solvent having similar properties to a solvent included in a coating liquid after removing the moisture at room temperature.

The solvent exchange method may be, for example performed according to the steps (1) to (9), as follows:

(1) Addition of non-aqueous based solvent of reaction A
(2) Addition of additive I of reaction A (dispersing agent)
(3) Dispersion of graphene (ultrasonic wave, shearing force)
(4) Preparation of graphene dispersion
(5) Reaction A: non-aqueous based solvent+ceramic precursor
(6) Reaction B: Resultant of reaction A +$H_2O$+additive II
(7) GP-ceramic hybrid sol (Coating liquid)
(8) Coating process
(9) Transparent thermally conductive coating film The solvent exchange method may include: (1) preparing a dispersion by mixing a graphene powder, a first dispersing agent and a first non-aqueous based solvent; (2) preparing a mixture by adding a second non-aqueous based solvent and a precursor of the hydrate to the dispersion; and (3) preparing a graphene-containing sol solution mixing the mixture with a second dispersing agent and water.

The graphene powder, the first dispersing agent, and the first non-aqueous based solvent may be further mechanical dispersion-treated after the mixing and may be further washed with a non-aqueous based solvent before the mechanical dispersion treatment.

The washing with the non-aqueous based solvent may maximize suitability in the second half. In particular, the washing may use the same solvent as or a similar solvent to the first non-aqueous based solvent.

The process of washing the non-aqueous based solvent may be performed to thoroughly remove moisture ($H_2O$) adsorbed on the surface of the graphene. It may be a simple washing process, or may be performed through an ultrasonication dispersion treatment or after an ultrasonication dispersion treatment. This process may be performed as many times as needed. Through the process of washing with the non-aqueous based solvent, a removal degree of moisture at the surface of the graphene may have an effect on long-time stability of the sol solution. Therefore, a method of performing washing and/or a washing degree may control moisture and thus resultant properties. In particular, when moisture is removed, a sol stability effect may be maximized. In the first process of the method for preparing a coating layer of a graphene-ceramic hybrid according to an exemplary embodiment of the present invention, sol stability may be reduced by added moisture even if a small amount of moisture is added. Although an amount of moisture adsorbed on the graphene is small, stability of the entire graphene-ceramic hybrid mixed sol may be dramatically reduced because there is serious interface instability at an interface with the sol.

The first dispersing agent and second dispersing agent used in the solvent exchange method may be are each independently selected from the group consisting of polyethylene glycol (PEG), glycerol, hydrochloric acid (HCl), acetic acid, formic acid, citric acid, binder, and a combination thereof.

The first non-aqueous based solvent and second non-aqueous based solvent may be each independently an amphiphilic solvent, a water-soluble solvent except water, a non-water-soluble solvent, a polar solvent, a nonpolar solvent, or a combination thereof.

In particular, the first non-aqueous based solvent and second non-aqueous based solvent may be each independently selected from the group consisting of isopropyl alcohol(iso-propyl alcohol), ethanol, acetone, methylethylketone, methylalcohol, ethylalcohol, isopropylalcohol, acetylacetone, butylalcohol, ethylene glycol, polyethylene glycol, tetrahydrofuran, dimethyl formamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, and a combination thereof.

The graphene may have a uniform size by dispersing graphene, centrifuging the dispersion to remove a supernatant, and centrifuging a precipitate therefrom to obtain a precipitate again and then, at least twice repeating these all processes.

In an exemplary embodiment of the present invention, in the process of the mixing and dispersing of a silica nanoparticle and the precursors of the hydrate represented by Chemical Formula 1 in a hydrophilic solvent and mixing the same with the dispersed graphene, an additive selected from an inorganic powder, an organic additive, and a combination thereof may be further included.

For example, the inorganic powder may be mixed in an amount of about 5 parts by weight to 30 parts by weight based on 100 parts by weight of the mixed dispersed solution.

In particular, the inorganic powder may be included in an amount of about 5 parts by weight to 25 parts by weight, of about 7 parts by weight to 20 parts by weight, or particularly of about 7 parts by weight to 10 parts by weight.

When the amount of the inorganic powder is out of the range, coating properties may be deteriorated.

For example, the organic additive may be mixed in an amount of about 0.01 parts by weight to 10 parts by weight based on 100 parts by weight of the mixed dispersed solution.

Particularly, it may be included in an amount of about 0.01 parts by weight to 5 parts by weight, of about 0.1 parts by weight to 3 parts by weight, or particularly of about 0.01 parts by weight to 2 parts by weight.

When the amount of the organic additive is out of the range, coating properties may be deteriorated.

The silica nanoparticle and the hydrate represented by Chemical Formula 1 may be mixed and dispersed in a hydrophilic solvent.

The hydrophilic solvent may be a medium playing the most important role for stability and reactivity. Herein, a precondition under which graphene is dispersed into the hydrophilic solvent may be made to easily mix the graphene with a hydrophilic sol solution.

The hydrophilic solvent comprising a single component or more than two components may be required, since the hydrophilic solvent provides water necessarily required in a sol-gel reaction as a main reaction of the present invention. Accordingly, the hydrophilic solvent may be easily mixed with $H_2O$ molecule as a resulting material from the reaction, and well mixed with an alcohol group of silanol (—Si—OH) produced as a reaction intermediate of a precursor of the hydrate represented by Chemical Formula 1.

When the precondition that graphene is dispersed into the hydrophilic solvent is not made, hydrophilic sol may not be uniformly mixed with the graphene.

Herein, "the precondition that the graphene is dispersed into the hydrophilic solvent" may include, for example, the following three cases.

First, an aqueous graphene dispersion dispersed into water may be used.

The aqueous graphene dispersion may be prepared by applying electric current to graphite in a liquid, and graphene produced therefrom may be aqueously dispersed, since organic functional groups at the edge of the graphene are substituted with aqueous substituents (—OH, —COOH). This aqueous graphene dispersion may be simply mixed with an aqueous ceramic sol, preparing a uniform graphene-ceramic hybrid sol solution. In other words, the aqueous graphene dispersion as a commercial product may be used in a mixing process without a dispersing agent or an additional process.

Second, graphene including a plurality of hydrophilic group on the surface may be used in a small amount.

According to an exemplary embodiment of the present invention, since graphene in a small amount of about 0.01 wt % to 0.1 wt % is mixed with a ceramic sol solution, a uniform hybrid sol solution may not be obtained by dispersing graphene having a large amount of a hydrophilic group on the surface into the hydrophilic solvent such as water or alcohol and adding it to a ceramic sol solution.

Further, a binder, an inorganic powder, an organic additive, or the like added therewith may play an assistant role of preventing agglomeration of the graphene.

Third, graphene may be highly dispersed by dispersing it into a non-aqueous based solvent and then, susbstituting the non-aqueous based solvent with an aqueous solvent. In the present invention, the method is referred to a solvent exchange method, and the solvent exchange method is the same as described above.

Particular examples of the hydrophilic solvent may be water; alcohols such as methanol, ethanol, propanol, butanol, or isopropylalcohol (IPA), glycol; or a combination thereof, but is not limited thereto. For example, a mixed solvent of water and alcohol may be used.

A mixing amount of the hydrophilic solvent may be as follows: an amount of about 10 to 500 parts by weight of ethanol (or alcohols including one or more components) based on a 100 parts by weight of water, and in particular, a mixing weight ratio of water:alcohols may be about 100:50, about 100:100, about 100:150, about 100:200, about 100:300, about 100:400 or about 100:500. Exemplary mixing weight ratio may be of about 100:100, or about 100:200.

The precursors of the hydrate represented by Chemical Formula 1 may be a silicon-based compound, titanium isopropoxide (TTIP), tetramethyl orthosilicate (TMOS), and the like.

The silicon-based compound may be selected from the group consisting of betrimethoxysilane, triethoxysilane, methyltrimethoxysilane, methyltriethoxysilane, ethyltrimethoxysilane, ethyltriethoxysilane, propyltrimethoxysilane, prop yltriethoxysilane, isobutyltriethoxysilane, glycidoxypropyltrimethoxysilane, glycidoxypropyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, (N,N-dimethylaminopropyl)trimethoxysilane, (N,N-dimethylaminopropyl)triethoxysilane, and N,N-{(2-aminoethyl) (3-aminopropyl)}trimethoxysilane, or a combination thereof.

The Chemical Formula 1 may be represented by one of Chemical Formulae 1-1 to 1-3.

$X^1$-M-(OH)$_3$ [Chemical Formula 1-1]

$X^1X^2$-M-(OH)$_2$ [Chemical Formula 1-2]

$X^1X^2X^3$-M-(OH) [Chemical Formula 1-3]

In Chemical Formulae 1-1 to 1-3, M and $X^1$, $X^2$, and $X^3$ are the same as described above.

Preferably, the M may be Si.

For example, the precursors of the hydrate may be glycidoxypropyltrimethoxysilane, and may be mixed with a silane coupling agent selected from the group consisting of tetramethoxysilane, tetraethoxysilane, diphenylethoxysilane and a combination thereof.

The coating process may be performed by a general coating method, such as dip coating, spin coating, spray coating, paint coating, bar coating, flow coating, roll coating, or a combination thereof. Preferably, dip coating, spin coating, or spray coating may be used, however the process may not be limited thereto.

The coating process according to an exemplary embodiment may be performed using spray coating, regardless of kinds or shapes of substrates such as a large area, a curved substrate, and the like, but is not limited thereto.

Yet another embodiment of the present invention provides a vehicle part, such as head lamp. The vehicle part may comprise the graphene-containing coating film as described herein.

Particularly, a function to suppress fogging due to thermal conductivity by lamp heat may be expected due to effects of the present invention, for example excellent thermal conductivity as described above.

As a specific industrial application, it may be applied to a lens (PC curved substrate) of a vehicle head lamp to reduce fogging problems.

EXAMPLE

Hereinafter, specific exemplary embodiments of the present invention are described. However, the specific exemplary embodiments are merely used to exemplarily illustrate the present invention in more detail, and are not to be seen as limiting the present invention.

Furthermore, what is not described in this disclosure may be sufficiently understood by those skilled in the art who have knowledge in this field.

Preparation Example 1

Preparation of Graphene Oxide 10 g of natural graphite and 7.5 g of sodium nitrate were put in a reactor and 621 g of 96% sulfuric acid was slowly added while stiffing. After the three materials were sufficiently mixed, 45 g of manganese peroxide was added. Because the manganese peroxide has an explosion possibility and generates heat and gases when reacting with strong sulfuric acid, it was added over 1 hour little by little. After adding the manganese peroxide, the resultant was stirred at room temperature and reacted for 4 to 6 days. Then, 1 L of 5% sulfuric acid was added. Because a large amount of heat and gases may be generated, the reactor was suitably cooled and it was added slowly over 1 hour, and then the resultant was placed at room temperature for one day while being stirred. After one day, 30 g of 30% hydrogen peroxide was slowly added and reacted for 2 hours. In order to remove a large amount of sulfuric acid and hydrogen peroxide in the resulting product, washing and centrifugation were performed many times. The process was performed as follows: centrifugation was performed to remove a supernatant, a mixed solution including 3% sulfuric acid and 0.5% hydrogen peroxide at 1:1 was put in the remaining precipitate, and the resultant was sufficiently agitated and centrifuged and a supernatant was removed. Then, the mixed solution was added to the remaining precipitate and mixed. These processes were repeated 15 times, and then the mixed solution was replaced by water 5-6 times to obtain aqueous graphene-oxide (GO) slurry.

GO slurry is generally a material that is produced by acid treatment of graphite and purification processes, and thus GO slurry in the present invention may be a generally-known sheet-shaped graphene oxide or graphite oxide without limitation. In general, aqueous GO slurry has a solid content of 2 to 8 wt % based on centrifuged slurry.

(Preparation of Dispersion-treated GO)

The graphene oxide powder (GO) was added to ethanol and treated with an ultrasonic wave disperse (tip-shaped ultrasonic wave), or discharged into a fine nozzle with a high pressure (providing shear stress) to prepare dispersion-treated dispersion. Herein, a dispersing agent, BYK series was used.

Preparation Example 2

Preparation of Thermally Reduced Graphene

Reduced graphene oxide powder was prepared by adding hydrazine to the aqueous graphene oxide slurry according to Preparation Example 1, reacting the mixture for 24 hours, and centrifuging/washing/drying a precipitate obtained therefrom.

(Preparation of Dispersion-Treated RGO)

The graphene powder (RGO) was added to ethanol and treated with an ultrasonic wave disperse (tip-shaped ultrasonic wave), or discharged into a fine nozzle with a high pressure (providing shear stress) to prepare dispersion-treated dispersion. Herein, a dispersing agent, BYK series was used.

Preparation Example 3

Preparation of Chemically Reduced Graphene

Reduced graphene oxide powder was prepared by adding hydrazine to the aqueous graphene oxide slurry according to Preparation Example 1, reacting the mixture for 24 hours, and centrifuging/washing/drying a precipitate obtained therefrom.

(Preparation of Dispersion-Treated RGO)

The graphene powder (RGO) was added to ethanol and treated with an ultrasonic wave disperse (tip-shaped ultrasonic wave), or discharged into a fine nozzle with a high pressure (providing shear stress) to prepare dispersion-treated dispersion. Herein, a dispersing agent, BYK series was used.

Comparative Example 1

Preparation of Si(OH)$_4$ Typed SiO$_2$ Sol Solution 15 mg of the chemically reduced graphene preparation according to Example 3 was put in a 500 mL plastic bottle, 150 ml of IPA was added thereto, 20 g of PEG was added thereto, and the mixture was ultrasonication-dispersed for 10 minutes. Then, 100 ml of ethanol was added thereto, 10 ml of TMOS (tetramethyl orthosilicate) was added thereto, and the resulting mixture was agitated for greater than or equal to 24 hours. Herein, the resultant maintained about pH 3.3 by using hydrochloric acid. The TMOS had a hydrolysis shape of Si (OH)$_4$ including no organic functional group.

(Preparation of Graphene-SiO$_2$ Hybrid Coating Film I)

The graphene-ceramic hybrid sol solution was spin-coated (rpm 800). on a glass substrate surface-treated with plasma. The spin-coated film was vacuum-dried at room temperature and heat-treated at a temperature of 80° C. for 1 hour in a heater, manufacturing a GP-SiO$_2$ hybrid-coating film.

The formation of the coating film may include spray coating, bar coating, knife coating, screen printing, dip coating, and the like, The heat-treatment may include a vacuum heat treatment, an atmosphere heat treatment, an IR heat treatment, a convention heat treatment, a teat treatment using a heater, a heat treatment using an electromagnetic wave such as a laser and the like, a heat treatment using a microwave, and the like.

(Preparation of Graphene-SiO$_2$ Hybrid Coating Film II)

The graphene-ceramic hybrid sol solution was spray-coated on a PC (Polycarbonate) substrate surface-treated with plasma, vacuum-dried at a temperature of 50° C., and heat-treated on the surface by repetitively giving a instant thermal impact with an IR lamp. The heat treatment was performed at a temperature of 300° C. for an exposure time of 3 seconds. The heat treatment and the expose process were repeated. The repetition of the heat treatment and the expose process was performed after the substrate was substantially cooled down to room temperature, and the rear surface of the substrate was maintained at a temperature of 80° C. to 130° C. for the heat treatment, since this process is advantageous for a plastic substrate. The temperature may be further cooled down by cooling down a lower substrate lower (or air-cooled).

Figure 5:
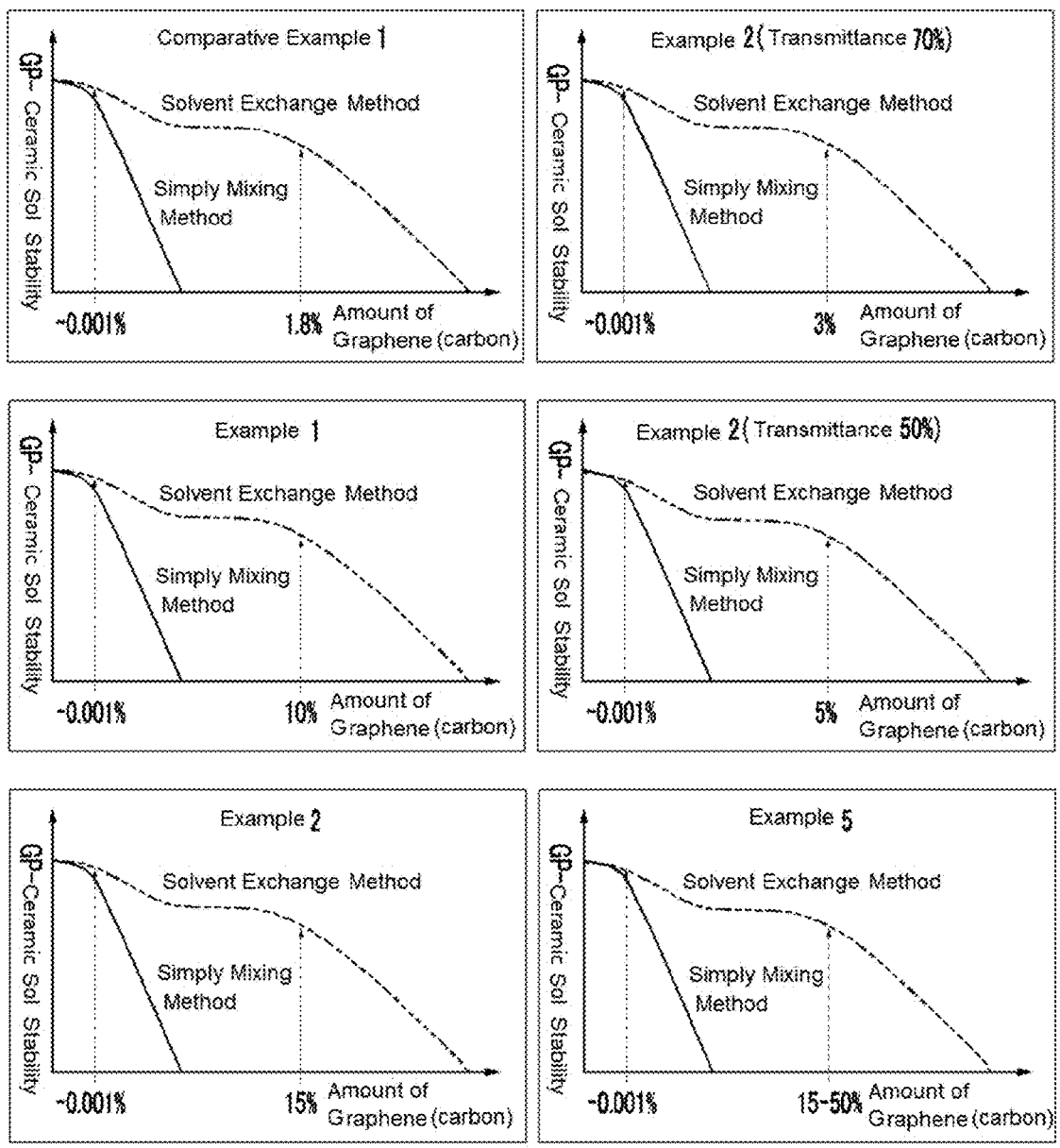
FIG. 5 is a graph showing the content of graphene in graphene-containing coating films maintaining sol stability in various exemplary embodiments of the present invention.

Referring to FIG. 5, the graphene-ceramic hybrid coating film formed of the graphene-ceramic hybrid sol solution includes about 1.8 wt % of graphene (carbon).

Example 1

Preparation of $Si(OH)_3X_1$ Type Graphene-Ceramic Hybrid Sol Solution

A $Si(OH)_3X_1$ type graphene-ceramic hybrid sol solution may be prepared in the following three methods depending on mixing.

1) A simply mixing method using a mechanical dispersion treatment method 50 mg of the graphene according to Preparation Example 3 was put in 100 ml of IPA, and the mixture was ultrasonic wave-dispersed for 10 minutes. After 1 hour, 1 ml of the outmost supernatant was taken therefrom, 100 ml of ethanol was added thereto, a solution obtained by dissolving 10 wt % to 40 wt % of glycidoxypropyltrimethoxysilane (hereinafter, GT) in a mixed solvent of water and ethanol in a weight ratio of 1:1 was added thereto, and 20 wt % of LUDOX® (20 nm of silica sol, SIGMA-ALDRICH, USA) and nitric acid were added thereto adjust pH in a range of 2 to 4, and then, the resultant was agitated for 24 hours. After the reaction, an ethylene diamine hardener was added thereto in the same numbers of mols as those of the GT, and the mixture was stirring for 30 minutes, preparing a $Si(OH)_3X_1$ type graphene-ceramic hybrid sol solution. Its final film included graphene in an amount ranging from 0.04 wt % to 7.5 wt %.

2) A method of adding an aqueous dispersion graphene solution from the beginning for mixing 100 ml of ethanol was added to 1 ml of a commonly-used aqueous dispersion graphene (1% of a weight-containing solution), a solution obtained by dissolving 10 wt % to 40 wt % of glycidoxypropyltrimethoxysilane (hereinafter, GT) in a mixed solvent of water and ethanol in a weight ratio of 1:1, 20 wt % of LUDOX® (20 nm of silica sol, SIGMA-ALDRICH, USA) and nitric acid were added thereto to adjust pH in a range of 2 to 4, and the mixture was agitated for 24 hours. After the reaction, an ethylene diamine hardener was added thereto in the same mols of those of the GT, and the resulting mixture was stirred for 30 minutes, preparing a $Si(OH)_3X_1$ type graphene-ceramic hybrid sol solution. Its final film included graphene in an amount of 0.06 wt % to 8.5 wt %.

When a kind of graphene is simply dispersed into water or alcohol, a process may be shortened. For example, graphene manufactured in a electrical stripping method, a graphene local oxidation method, and the like or graphene including a plurality of hydrophilic group on the surface may be in a small amount of about 0.01 wt % to 0.1 wt % during a sol reaction. Herein, an additive such as a binder, an inorganic powder, an organic additive, and the like may be used together to prevent agglomeration of the graphene.

3) Mixing by Solvent Exchange Method 15 mg of each chemical reduction graphene according to Preparation Example 3 was put in a 500 mL plastic bottle, 150 ml of IPA was added thereto, 10 g of PEG was added thereto, and the mixture was ultrasonic wave-dispersed for 10 minutes. Then, 100 ml of ethanol was added thereto, a solution obtained by dissolving 10 to 40 wt % of glycidoxypropyltrimethoxysilane (hereinafter, GT) in a mixed solvent of water and ethanol in a weight ratio of 1:1 was added thereto, and then, the mixture was agitated for 24 hours by adding 20 wt % of LUDOX® (20 nm of a silica sol, SIGMA-ALDRICH, USA) and nitric acid thereto to adjust its pH in a range of 2 to 4. After the reaction, an ethylene diamine hardener was added thereto in the same number of mol as that of GT, and the mixture was stirred for 30 minutes, preparing a $Si(OH)_3X_1$ type graphene-ceramic hybrid sol solution.

(Manufacture of Coating Film)

A coating film was manufactured according to the same method as Comparative Example 1 except for using the $Si(OH)_3X_1$ type graphene-ceramic hybrid sol solution.

Referring to FIG. 5, the graphene-ceramic hybrid coating film formed of the graphene-ceramic hybrid sol solution according to Example 1 and maintaining sol stability included about 0.001 wt % to 10 wt % of graphene.

Since Example includes one organic functional group ($X_1$) compared with Comparative Example 1, the maximum amount of graphene in a coating layer maintaining sol stability was in a range of 1.8 wt % to 10 wt %, which was greater than or equal to times improved.

When a highly dispersed graphene solution was simply mixed with a ceramic sol solution (a mechanical dispersion treatment), the maximum amount of graphene was improved up to about 7.5 wt %. In addition, when an aqueous dispersed graphene solution was added from the beginning, the maximum amount of graphene was improved up to about 8.5 wt %, and when the mixing was performed in a solvent exchange method, the maximum amount of graphene was improved up to about 10 wt %.

Example 2

Manufacture of $Si(OH)_3X_1+Si(OH)_2X_1X_2$ Type Graphene-Ceramic Hybrid Sol Solution 1) Simple Mixing by Using Mechanical Dispersion Treatment 50 mg of graphene prepared in Preparation Example 3 was put in 100 ml of IPA and ultrasonic wave dispersed for 10 minutes. After one hour, 1 ml of an outmost supernatant not going down therein was taken from, 100 ml of ethanol was added thereto, a solution obtained by dissolving 10 to 40 wt % of a mixture of glycidoxypropyltrimethoxysilane (hereinafter, GT) and diphenyldiethoxysilane (a weight ratio of 1:1) in a mixed solvent of water and ethanol in a ratio of 1:1, and then, the mixture was agitated for 24 hours by using 20 wt % of LUDOX® (20 nm of silica sol, SIGMA-ALDRICH, USA) and nitric acid to adjust its pH into 2 to 4. After the reaction, an ethylene diamine hardener was added thereto in the same number of mol as that of GT, and the mixture was stirred for 30 minutes, preparing a $Si(OH)_3X_1+Si(OH)_2X_1X_2$ type graphene-ceramic hybrid sol solution. Its final film included graphene in an amount of about 0.08 wt % to 13.5 wt %.

2) Mixing by Adding Aqueous Dispersed Graphene Solution from the Beginning 100 ml of ethanol was added to 1 ml of aqueous dispersed graphene (1% of a weight content in a solution), a solution obtained by dissolving 10 wt % to 40 wt % of a mixture of glycidoxypropyltrimethoxysilane (hereinafter, GT) and diphenyldiethoxysilane (1:1 of a weight ratio) in a mixed solvent of water and ethanol in 1:1 of a weight ratio was added thereto, and then, the mixture was agitated for 24 hours by using 20 wt % of LUDOX® (15 nm of a silica sol, SIGMA-ALDRICH, USA) and nitric acid to adjust its pH into 2 to 4. After the reaction, an ethylene diamine hardener was added in the same number of mol as that of GT was added thereto, and the mixture was stirred for 30 minutes, preparing a $Si(OH)_3X_1+Si(OH)_2X_1X_2$ type graphene-ceramic hybrid sol solution. Its final film included graphene in an amount of about 0.09 wt % to 14 wt %.

3) Mixing in Solvent Exchange Method 15 mg of the chemical reduction graphene according to Preparation Example 3 was put in a 500 mL plastic bottle, 150 ml of IPA was added thereto, and 10 g of PEG was added thereto, and the mixture was ultrasonic wave dispersed for 10 minutes. Then, 100 ml of ethanol was added thereto, a solution obtained by dissolving 10 to 40 wt % of a mixture of glycidoxypropyltrimethoxysilane (hereinafter, GT) and diphenyldiethoxysilane (1:1 of a weight ratio) in a mixed solvent of water and ethanol in a ratio of 1:1.5 was added thereto, and then, the resulting mixture was reacted for 24 hours by adding 20 wt % of LUDOX® (15 nm of a silica sol, SIGMA-ALDRICH, USA) and nitric acid to adjust its pH into 2 to 4. After the reaction, an ethylene diamine hardener was in the same number of mol of that of GT was added thereto, and the mixture was stirred for 30 minutes, preparing a $Si(OH)_3X_1+Si(OH)_2X_1X_2$ type graphene-ceramic hybrid sol solution.

(Manufacture of Coating Film)

A coating film was formed in the same method as Comparative Example 1 except for using the $Si(OH)_3X_1+Si(OH)_2X_1X_2$ type graphene-ceramic hybrid sol solution.

Referring to FIG. 5, the graphene-ceramic hybrid coating film formed of the graphene-ceramic hybrid sol solution according to Example 2 and maintaining sol stability included graphene (carbon) in an amount of about 0.001 wt % to 15 wt %.

Compared with Comparative Example 1, the maximum amount of graphene in a coating film including two organic functional groups ($X_1X_2$) and maintaining sol stability was 8 times improved in an amount of 1.8 wt % to 15 wt %.

When a highly dispersed graphene solution was simply mixed with a ceramic sol solution (a mechanical dispersion treatment), the maximum amount of graphene was improved up to about 13.5 wt %. Further, when an aqueous dispersed graphene solution was added from the beginning, the maximum amount of graphene was improved up to about 14 wt %, and when the mixing was performed in a solvent exchange method, the maximum amount of graphene was improved up to about 15 wt %.

Herein, the amount of graphene was reduced to form a transparent coating layer, the graphene was included in an amount of about 5 wt % for transmittance of 50%, and the graphene was included in an amount of about 3 wt % for transmittance of 70%.

Example 3

Manufacture of $Si(OH)_3X_1+Si(OH)_4$ Type and Hardener Type Organic/Inorganic Hybrid Sol)

1) Simple Mixing in Mechanical Dispersion Treatment 50 mg of graphene according to Preparation Example 3 was added to 100 ml of IPA and ultrasonic wave-dispersed for 10 minutes. Then, 1 ml of an outmost supernatant not doing down after one hour was taken therefrom, 100 ml of ethanol was added thereto, 10 to 40 wt % of a solution obtained by dissolving a mixture of glycidoxypropyltrimethoxysilane (hereinafter, GT) and TMOS (1:1 of a weight ratio) in a mixed solvent of water and ethanol in 1:2 of a weight ratio was added thereto, and the mixture was reacted for 24 hours by adding 20 wt % of LUDOX® (15 nm of a silica sol, SIGMA-ALDRICH, USA) and nitric acid to adjust its pH in a range of 2 to 4. After the reaction, an ethylene diamine hardener was added thereto in the same number of mol as that of the GT, and the mixture was stirred for 30 minutes, preparing a $Si(OH)_3X_1+Si(OH)_4$ type graphene-ceramic hybrid sol solution. Its final film included graphene in an amount of 0.03 wt % to 4.5 wt %.

2) Mixing by using Aqueous Dispersed Graphene Solution from the Beginning 100 ml of ethanol was added to 1 ml of commonly-used aqueous dispersed graphene (1% of a weight content in a solution), a solution obtained by dissolving 10 to 40 wt % of a mixture of glycidoxypropyltrimethoxysilane (hereinafter, GT) and TMOS (1:1 of a weight ratio) in a mixed solvent of water and ethanol in a weight ratio of 1:2, and the mixture was reacted for 24 hours by adding 20 wt % of LUDOX® (15 nm of a silica sol, SIGMA-ALDRICH, USA) and nitric acid to adjust pH in a range of 2 to 4. After the reaction, an ethylene diamine hardener was added thereto in the same number of mol as that of the GT, and the mixture was stirred for 30 minutes, preparing a $Si(OH)_3X_1+Si(OH)_4$ type graphene-ceramic hybrid sol solution. Its final film included graphene in an amount of 0.07 wt % to 5 wt %.

3) Mixing by Solvent Exchange Method 15 mg of the chemical reduction graphene of Preparation Example 3 was put in a 500 mL plastic bottle, 150 ml of IPA was added thereto, 10 g of PEG was added thereto, and the mixture was ultrasonic wave-dispersed for 10 minutes. Then, 100 ml of ethanol was added thereto, a solution obtained by dissolving 10 to 40 wt % of a mixture of glycidoxypropyltrimethoxysilane (hereinafter, GT) and TMOS (1:1 of a weight ratio) in a mixed solvent of water and ethanol in 1:2 of a weight ratio, and then, the mixture was reacted for 24 hours by adding 20 wt % of LUDOX® (15 nm of a silica sol, SIGMA-ALDRICH, USA) and nitric acid to adjust its pH in a range of 2 to 4. After the reaction, an ethylene diamine hardener was added thereto in the same number of mol as that of GT, and the mixture was stirred for 30 minutes, preparing a $Si(OH)_3X_1+Si(OH)_4$ type graphene-ceramic hybrid sol solution.

(Manufacture of Coating Film)

A coating film was formed in the same method as Comparative Example 1 except for using the $Si(OH)_3X_1+Si(OH)_4$ type graphene-ceramic hybrid sol solution.

The graphene-ceramic hybrid coating film formed of the graphene-ceramic hybrid sol solution according to Example 3 and maintaining sol stability included graphene (carbon) in an amount of about 0.01 wt % to 5 wt %.

The result may be caused from a reason that a coating film maintaining sol stability compared with Comparative Example 1 has a 2 to 3 times improved maximum amount of graphene.

Examples 4 to 6

Addition of Polymer

Example 4

A graphene-ceramic hybrid sol solution and a coating film formed thereof were manufactured according to the same method as Example 1 except for adding 10 parts by weight of PVA based on 100 parts by weight of a graphene-solvent-hydrate precursor before adding a hardener thereto during manufacture of the graphene-ceramic hybrid sol solution.

The coating film maintaining sol stability included graphene in up to about 35 wt % improved maximum amount.

The dispersion stability of graphene was increased as an organic component was increased on the interface of ceramic-graphene.

Example 5

A graphene-ceramic hybrid sol solution and a coating film formed thereof were manufactured according to the same method as Example 2 except for adding 10 parts by weight of PVA (polyvinyl alcohol) based on 100 parts by weight of a graphene-solvent-hydrate precursor solution before adding a hardener thereto during manufacture of the graphene-ceramic hybrid sol solution.

Referring to FIG. 5, the coating film maintaining sol stability included graphene in up to about 50 wt % improved maximum amount.

Example 6

A graphene-ceramic hybrid sol solution and a coating film formed thereof were manufactured according to the same method as Example 3 except for using 10 parts by weight of PVA (polyvinyl alcohol) based on 100 parts by weight of a graphene-solvent-hydrate precursor before adding a hardener thereto during manufacture of the graphene-ceramic hybrid sol solution.

The coating film maintaining sol stability included graphene in up to about 15 wt % improved maximum amount.

Comparative Example 2 and Example 7

Addition of Silica Particle

Comparative Example 2

A $Si(OH)_3X_1$ type sol solution and a coating film formed thereof were manufactured by agitating 50 ml of IPA and 50 ml of $Si(OH)_3X_1$ for greater than or equal to 30 minutes, 10 ml of water, 10 g of PEG (polyethylene glycol), and LUDOX® (20 nm of a silica sol, SIGMA-ALDRICH, USA) and 1 ml of HCl thereto and uniformly reacting the for 90 minutes as being agitated.

Example 7

A graphene-ceramic hybrid sol solution and a coating film formed thereof were manufactured according to the same method as Example 4 except for using 0.1 parts by weight of silver nanowire and 0.1 parts by weight of silver nanoparticle based on 100 parts by weight of a graphene-solvent-hydrate precursor solution instead of the polyvinyl alcohol.

Evaluation 1: Uniformity (Stability) of Graphene-Containing Hybrid Sol Solution

Figure 6:
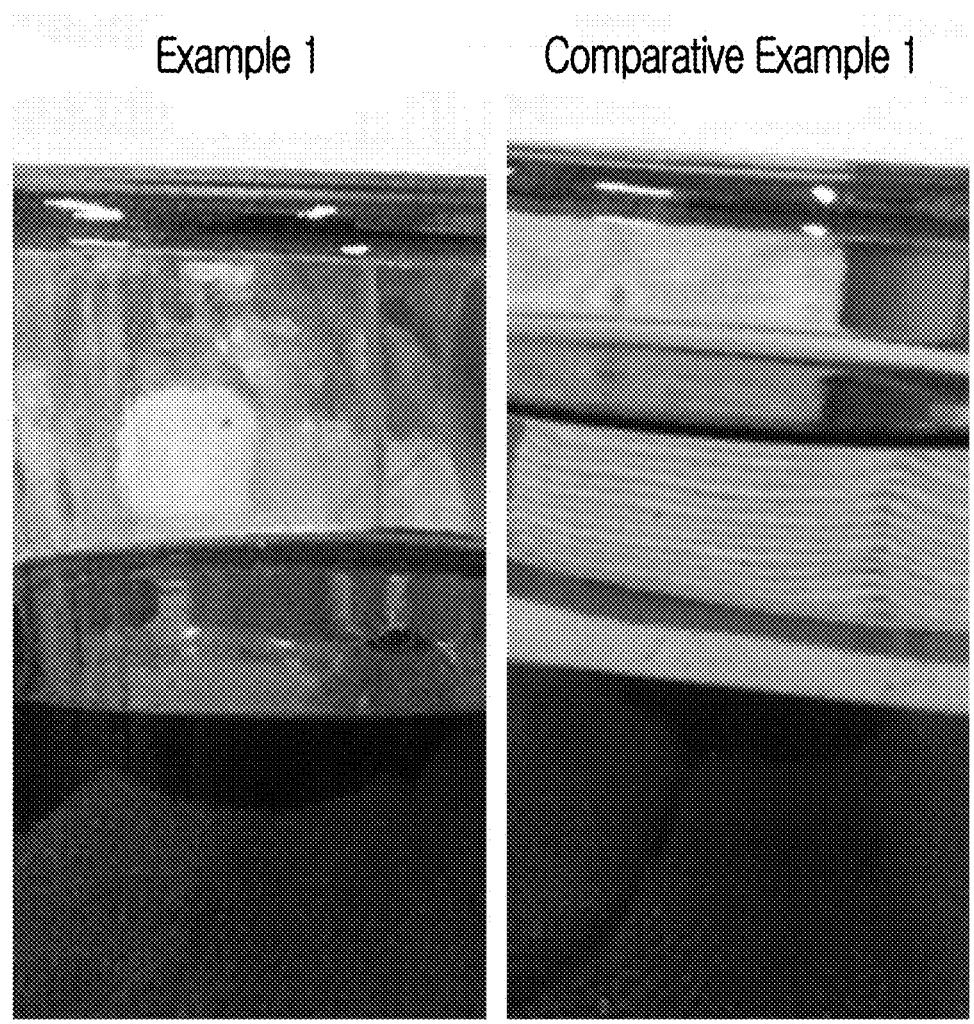
FIG. 6 shows a photographic view of dispersion stability and storage-stability of an exemplary coating composition for forming an exemplary graphene-containing sol according to an exemplary embodiment of the present invention.

FIG. 6 shows the results of adding uniformly dispersed graphene to be 10 wt % in a coating film formed of a graphene-containing sol solution as a resulting material to each sol solution according to Example 1 and Comparative Example 1. Referring to FIG. 6, the sol solution according to Example 1 showed excellent dispersion stability, while the solution according to Comparative Example 1 was mostly precipitated. In particular, a transparent brown part of a supernatant in the sol solution according to Comparative Example 1 showed that the amount of graphene was saturated, and herein, the amount of graphene was in a range of 0.001 to 1.8 wt % in a coating film obtained from the supernatant.

Examples 2 to 4 showed a similar phenomenon to that of FIG. 6. A dispersion prepared according exemplary embodiments of the present invention had a high concentration and thus showed greater than or equal to about 1 month of stability (maintained greater than or equal to about 1 month of stability in refrigeration and thermal impact at a temperature of 60° C.), which is improved stability not found in a conventional graphene dispersion. The amount of graphene in a dispersion is presently reported in a range of about 1 to 2 wt %.

Evaluation 2: Stability of Graphene-Containing Hybrid Coating Film

Figure 7:
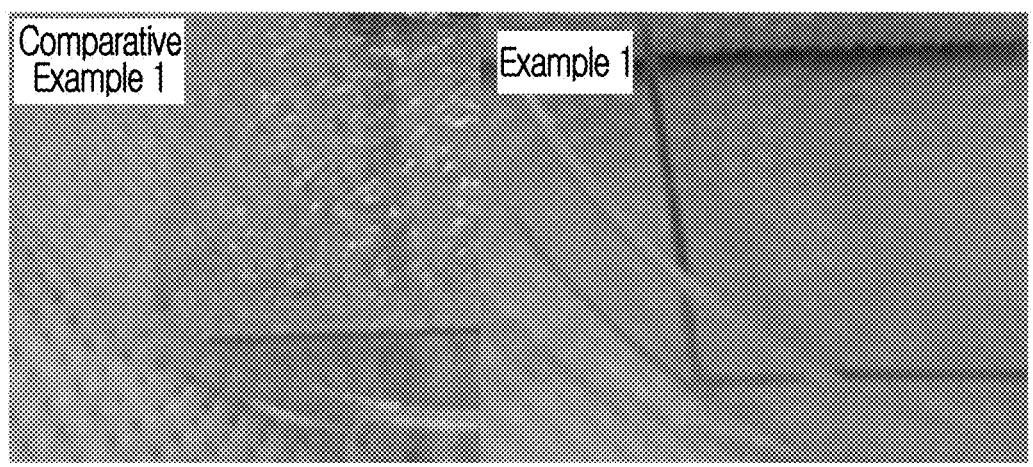
FIG. 7 shows a photographic view of uniformity and transparency of an exemplary graphene-containing coating film according to an exemplary embodiment of the present invention.

FIG. 7 shows the result of a film obtained by coating each coating liquid according to Comparative Example 1 and Example 1 on a PC substrate and drying it.

The film obtained in Comparative Example 1 was easily stripped like being crumbled, but the film obtained in Example 1 according to an exemplary embodiment the present invention had a smooth and transparent surface and showed satisfactory coating property.

Evaluation 3: Transmittance of Graphene-Containing Hybrid Coating Film

Figure 8:
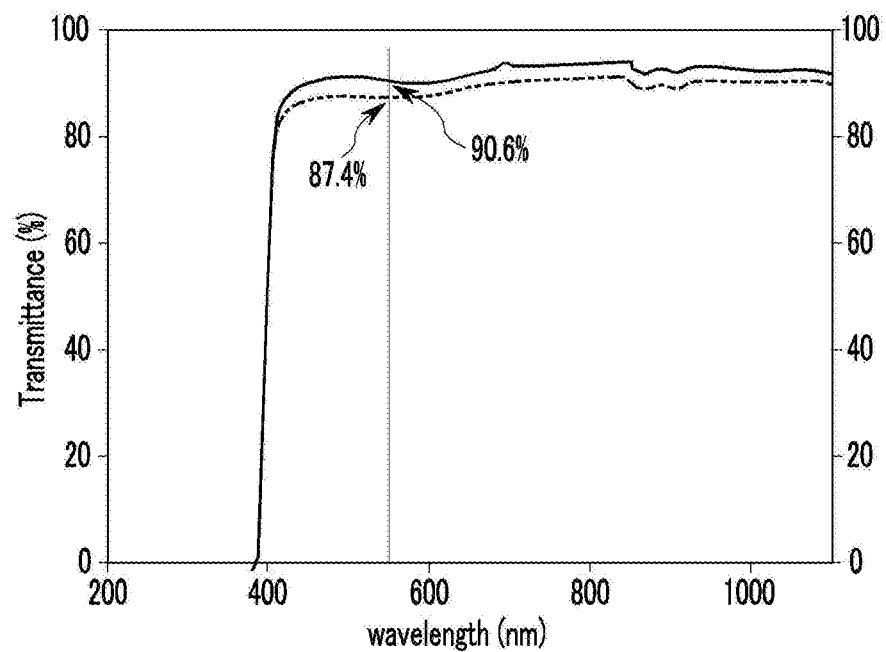
FIG. 8 is a graph showing transmittance of an exemplary graphene-containing coating film according to an exemplary embodiment of the present invention.

FIG. 8 shows the transmittance evaluation result of the graphene-containing ceramic hybrid coating film according to Example 2 measured with a UV-Vis spectrophotometer (V-530, Jasco analytical Instruments) by coating a sol solution including 0.03 wt % of graphene on a head lamp (made of a PC material).

FIG. 8 is a graph showing transmittance of a graphene-containing coating film according to an exemplary embodiment of the present invention.

Referring to FIG. 8, the head lamp made of a bare-PC material showed transmittance of 87.4% at a wave lenth of 550 nm, but a coating film according to the present invention showed improved transmittance of 90.6%. The transmittance was improved, since organic/inorganic hybrid components were well bonded for example, at an interface junction and the like as described above, and thus formed a sufficient quality film and changed an index [NOTE: please describe the "index"].

Evaluation 4: Thermal Conductivity of Graphene-Containing Hybrid Coating Film

Thermal conductivity of a graphene-containing hybrid coating film according to the present invention was evaluated by using a thermal conductivity measuring equipment (home-made).

The equipment for measuring the thermal conductivity of the graphene-containing ceramic hybrid coating film was fabricated by heating a thermocouple, the center of a PC (poly carbonate) substrate (a size of 10 cm×10 cm, a thickness of 2 mm) with a halogen lamp as a heating source (heating shape and diameter: circle and 5 cm) up to a temperature of about 120° C., and measuring a temperature at the thermocouple (TC2) and simultaneously, measuring a temperature at the edge of the substrate temperature (TC1).

FIG. 8 shows the thermal conductivity results measured by using the equipment.

Figure 9:
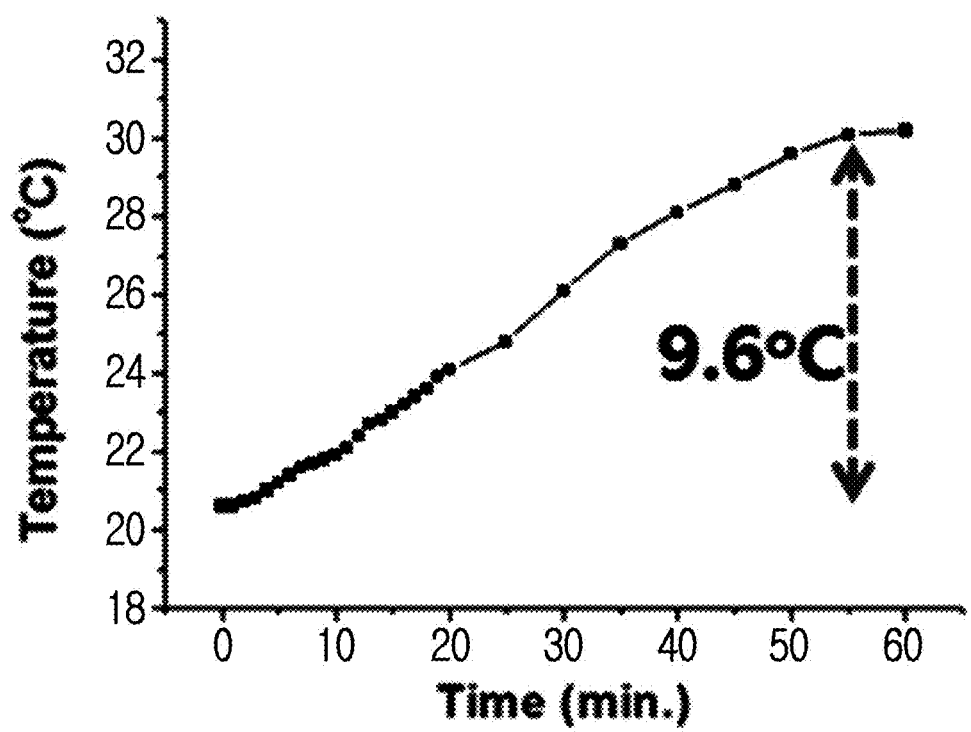
FIG. 9 is a graph showing thermal conductivity of an exemplary graphene-containing coating film according to an exemplary embodiment of the present invention.

FIG. 9 is a graph showing the thermal conductivity effect of the graphene-containing coating film according to an exemplary embodiment of the present invention.

On the other hand, a coating film manufactured by using only pure GT (a ceramic sol) on a common PC substrate according to Comparative Example 2 showed about 2.8° C.

increased effect per hour, but the coating film including graphene according to Example 1 showed 9.6° C. increased effect per hour and a larger thermal conductivity effect. The reason is that the graphene was uniformly dispersed in the coating film, so that properties of the graphene were well realized. However, when the graphene was unstably dispersed and brought about an interface delamination phenomenon, a thermal conductivity effect of around 2.8° C. and less than or equal to 2.8° C. was obtained just like a coating film including only a ceramic sol.

When graphene was included in an minimum amount of 0.001 wt % in the present invention, thermal conductivity was improved about twice as much as when graphene was not included.

The coating film of Example 2 showed the highest thermal conductivity of about 12.5° C.

Evaluation 5: Surface Function of Graphene-Containing Hybrid Coating Film Depending on Additive FIG. 10 shows the waterdrop contact angle result of a graphene-containing organic-inorganic ceramic hybrid coating film according to an exemplary embodiment of the present invention.

Figure 10:
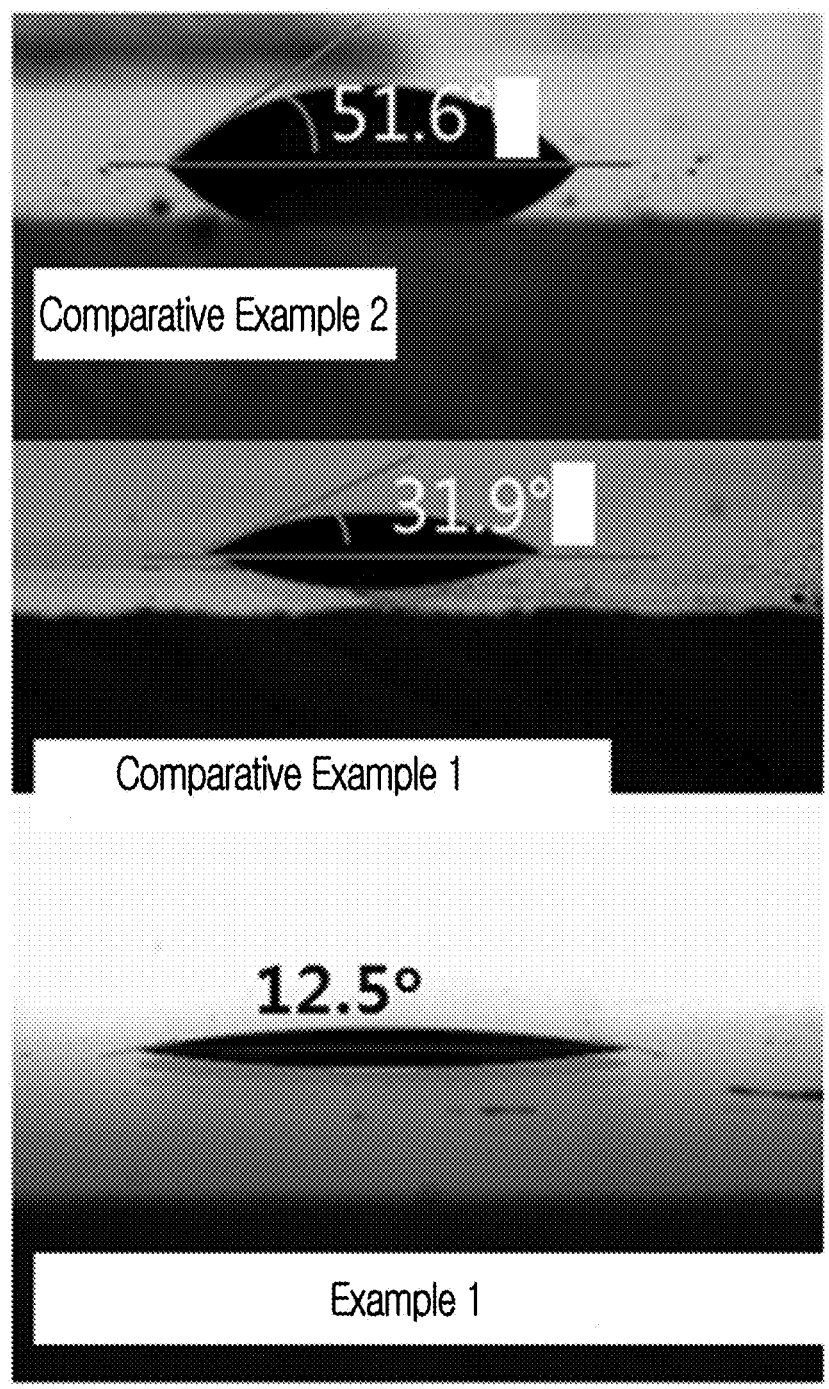
FIG. 10 shows waterdrop contact angle of exemplary graphene-containing coating films according to various exemplary embodiments of the present invention.

FIG. 10 shows the waterdrop contact angle results of a coating film formed of a coating liquid according to Comparative Example 2, a coating film formed of a coating liquid according to Comparative Example 1, and a coating film formed of a coating liquid according to Example 1.

Referring to FIG. 10, the contact angle was reduced, as graphene was more included, and when a silica nanoparticle was further added, the contact angle was further reduced. When the contact angle was reduced, surface hydorphilic characteristics were increased.

Figure 11:
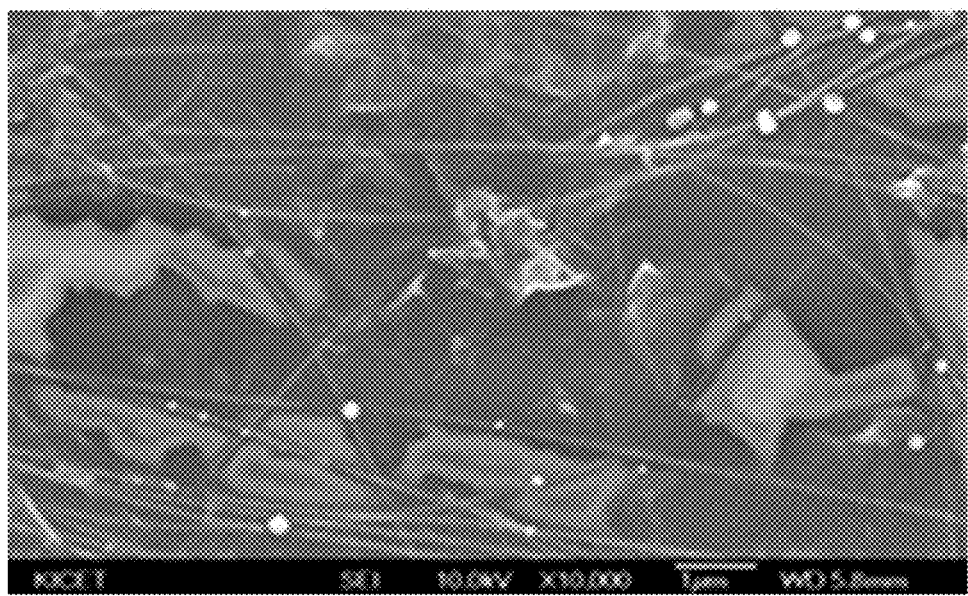
FIG. 11 shows a field emission-scanning electron microscope (FE-SEM) photograph of an exemplary graphene-containing coating film according to an exemplary embodiment of the present invention.

FIG. 11 is a TEM (Transmission Electron Microscope) photograph showing the graphene-containing organic-inorganic ceramic hybrid coating film according to an exemplary embodiment of the present invention.

Referring to FIG. 11, graphene (a two dimension sheet-shaped material), silver nanowire (an one dimension linear material), and silver nanoparticle (a zero-dimension particle-shaped material) were well fused among sol matrix. Herein, since variously-shaped solid-phased materials were used, a polymer binder may be used to well bond them.

In Evaluations 4 and 5, the present exemplary embodiment sufficiently showed a thermal conductivity effect and a surface contact angle effect (a surface functionality) due to graphene.

Evaluation 6: Heat Treatment of Graphene-Containing Coating Film

Figure 12:
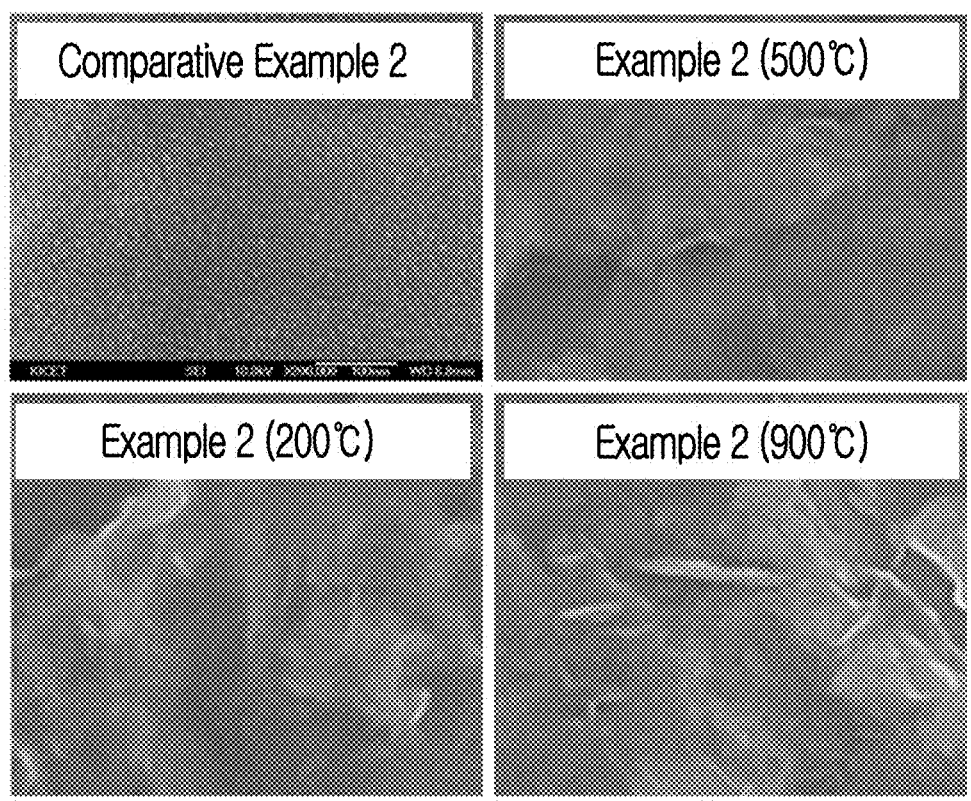
FIG. 12 shows FE-SEM photographs of exemplary heat-treated graphene-containing coating films according to various exemplary embodiments of Comparative Example and the present invention.

The coating film obtained in Example 2 was heat-treated at a temperature of 200° C. in the air, at a temperature of 500° C. under an oxygen atmosphere, and at a temperature of 900 ° C. under a nitrogen atmosphere, and the results as provided in FIG. 12.

Referring to FIG. 12, graphene having a two dimensional carpet was vividly maintained by using a coating solution including a polymer, a silver nano wire, a silver nanoparticle, and the like.

These exemplary embodiments show that an organic component may be required to well bond graphene-ceramic components as aforementioned, and accordingly, an organic functional group may be importantly designed to be included in a ceramic precursor from an initial step. In addition, a moiety oxidized earlier than graphene may be necessarily required to prevent oxidization of the graphene during realization of graphene properties and firing, and accordingly, additives, that is, a reagent capable of M(OH)$_4$-shaped hydrolysis, a polymer additive, a dispersing agent, an organic material additive, a one dimensional nano material, a zero-dimension nanomaterial were added but realized new properties.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A graphene-containing coating film, comprising:
  at least one hydrate represented by Chemical Formula 1;
  a graphene positioned on the surface of the hydrate represented by Chemical Formula 1; and
  a silica particle positioned on the surface of the hydrate of Chemical Formula 1 and positioned on the surface of the graphene in a shape of discontinuous island,
  wherein the silica particle include agglomeration of a plurality of silica nanoparticles:

$$X_n\text{-M-(OH)}_{4-n} \qquad \text{[Chemical Formula 1]}$$

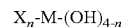

wherein, in Chemical Formula 1,
  M is selected from the group consisting of Si, Ti, Ag, Sn, In, and Zn, and a combination thereof,
  X is:
  a) a C1 to C30 alkyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group;
  b) a C1 to C30 alkenyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group; or
  c) a C1 to C30 alkynyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group, and
  n is an integer of 1 to 3.

2. The graphene-containing coating film of claim 1, wherein the graphene-containing coating film comprises: a first region including the hydrate represented by Chemical Formula 1 and the silica particle bound with each other; and a second region including the hydrate represented by Chemical Formula 1, the graphene and the silica particle bound with one another.

3. The graphene-containing coating film of claim 2, wherein an average diameter of the silica particle of the first region is from about 5 nm to about 50 nm, and an average diameter of the silica particle of the second region is from about 5 nm to about 25 nm.

4. The graphene-containing coating film of claim 1, wherein an average diameter of the silica nanoparticle is from about 5 nm to about 30 nm.

5. The graphene-containing coating film of claim 1, wherein a thickness of the graphene is from about 0.4 nm to about 5 nm.

6. The graphene-containing coating film of claim 1, wherein a major axis length of the graphene is from about 100 nm to about 10,000 nm, and a minor axis length of the graphene is about from 100 nm to about 900 nm.

7. The graphene-containing coating film of claim 1, wherein an amount of the graphene is from about 0.001 wt % to about 50 wt % based on the total weight of the hydrate represented by Chemical Formula 1, the graphene, and the silica nanoparticle.

8. The graphene-containing coating film of claim 1, wherein when transmittance is greater than or equal to about 70%, the an amount of the graphene is from about 0.001 wt % to about 3 wt % based on the total weight of the hydrate represented by Chemical Formula 1, the graphene, and the silica nanoparticle.

9. The graphene-containing coating film of claim 1, wherein the graphene-containing coating film has a thickness of about 100 nm to 2 μm.

10. The graphene-containing coating film of claim 1, wherein when transmittance is greater than or equal to about 70%, the graphene-containing coating film has a thickness of about 200 nm to 500 nm.

11. The graphene-containing coating film of claim 1, wherein the Chemical Formula 1 is represented by one of Chemical Formulae 1-1 to 1-3:

  [Chemical Formula 1-1]

  [Chemical Formula 1-2]

  [Chemical Formula 1-3]

wherein, in Chemical Formulae 1-1 to 1-3,
M is selected from the group consisting of Si, Ti, Ag, Sn, In, and Zn, and a combination thereof,
$X^1$, $X^2$ and $X^3$ are each independently:
a) a C1 to C30 alkyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group;

b) a C1 to C30 alkenyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group; or c) a C1 to C30 alkynyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group.

12. The graphene-containing coating film of claim 1, wherein the M is Si or Ti.

13. The graphene-containing coating film of claim 1, wherein the graphene-containing coating film further comprises an additive selected from the group consisting of an inorganic powder, an organic additive, and a combination thereof.

14. The graphene-containing coating film of claim 12, wherein the inorganic powder has an average diameter of about 5 nm to 50 nm.

15. A method of preparing a graphene-containing coating film comprising
dispersing a graphene;
mixing and dispersing a silica nanoparticle and the precursor of the hydrate represented by Chemical Formula 1 in a hydrophilic solvent and mixing the same with the dispersed graphene;
performing hydrolysis and condensation reactions of the mixed dispersed solution to prepare a graphene-containing sol solution;
coating the graphene-containing sol solution on a substrate and drying the same at a temperature of about 25° C. to 400° C.; and
heat-treating the dried film at a temperature of about 50° C. to 900° C.,

  [Chemical Formula 1]

wherein, in Chemical Formula 1,
M is selected from the group consisting of Si, Ti, Ag, Sn, In, and Zn, and a combination thereof,
X is: a) a C1 to C30 alkyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group;

b) a C1 to C30 alkenyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group; or c) a C1 to C30 alkynyl group substituted or unsubstituted with at least one functional group selected from the group consisting of an epoxy group, a glycidoxy group, a vinyl group, an acryl group, a methacryl group, a carboxyl group, an amino group, a thiol group, a phosphoric acid group, a fluoro group, a chloro group, a bromo group, an iodine group, a hydroxy group, a substituted or unsubstituted C1 to C10 alkoxy group, a substituted or unsubstituted C1 to C10 ketone group, a substituted or unsubstituted C1 to C10 amine group, a substituted or unsubstituted C1 to C10 sulfur group, a substituted or unsubstituted C1 to C10 ester group, and a substituted or unsubstituted C1 to C10 silyl group, and n is an interger of 1 to 3.

16. A vehicle part comprising a graphene-containing coating film of claim 1.

17. The vehicle part of claim 16 is a head lamp.

18. A vehicle comprising a vehicle part of claim 16.

19. The method of claim 15, wherein the silica nanoparticle is present in an amount of about 5 to 20 wt % based on the total amount of the mixed dispersed solution;

the precursor of the hydrate represented by Chemical Formula 1 is present in an amount of about 10 to 40 wt % based on the total amount of the mixed dispersed solution;

the highly dispersed graphene is present in an amount of about 0.001 to 15 wt % based on the total amount of the mixed dispersed solution; and the hydrophilic solvent is present in a balance amount.

20. The method of claim 15, wherein the graphene is dispersed by mechanical disperse treatment, or a solvent exchange method.

21. The method of claim 20, wherein the solvent exchange method comprises:

preparing a dispersion by mixing a graphene powder, a first dispersing agent and a first non-aqueous based solvent;

preparing a mixture by adding a second non-aqueous based solvent and a precursor of the hydrate to the dispersion; and preparing a graphene-containing sol solution by mixing the mixture with a second dispersing agent and water.

22. The method of claim 15, wherein in mixing and dispersing of the silica nanoparticle and the precursor of the hydrate represented by Chemical Formula 1 in a hydrophilic solvent and mixing the same with the highly dispersed graphene, an additive selected from the group consisting of an inorganic powder, an organic additive, and a combination thereof are further included.

23. The method of claim 22, wherein the inorganic powder is mixed in an amount of about 5 parts by weight to 30 parts by weight based on 100 parts by weight of the mixed dispersed solution.

24. The method of claim 22, wherein the organic additive is mixed in an amount of about 0.01 parts by weight to 10 parts by weight based on 100 parts by weight of the mixed dispersed solution.

25. The method of claim 15, wherein the precursor of the hydrate represented by Chemical Formula 1 is selected from the group consisting of trimethoxysilane, triethoxysilane, methyltrimethoxysilane, methyltriethoxysilane, ethyltrimethoxysilane, ethyltriethoxysilane, propyltrimethoxysilane, prop yltriethoxysilane, isobutyltriethoxysilane, glycidoxypropyltrimethoxysilane, glycidoxypropyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, (N,N-dimethylaminopropyl)trimethoxysilane, (N,N-dimethylaminopropyl)triethoxysilane, and N,N-{(2-aminoethyl) (3-aminopropyl)}trimethoxysilane, or a combination thereof.

* * * * *